US012670922B2

(12) United States Patent
Cao et al.

(10) Patent No.: US 12,670,922 B2
(45) Date of Patent: Jun. 30, 2026

(54) AUDIO PROCESSING METHOD AND APPARATUS

(71) Applicant: HONOR DEVICE CO., LTD., Shenzhen (CN)

(72) Inventors: Guozhi Cao, Shenzhen (CN); Zhenyi Liu, Shenzhen (CN); Jianyong Xuan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 224 days.

(21) Appl. No.: 18/691,538

(22) PCT Filed: May 17, 2023

(86) PCT No.: PCT/CN2023/094896
§ 371 (c)(1),
(2) Date: Mar. 13, 2024

(87) PCT Pub. No.: WO2023/231787
PCT Pub. Date: Dec. 7, 2023

(65) Prior Publication Data
US 2024/0404545 A1 Dec. 5, 2024

(30) Foreign Application Priority Data

May 30, 2022 (CN) .......................... 202210603382.1

(51) Int. Cl.
*G10L 21/0308* (2013.01)
*G10L 21/0272* (2013.01)
(Continued)

(52) U.S. Cl.
CPC ...... *G10L 21/0308* (2013.01); *G10L 21/0272* (2013.01); *G10L 25/21* (2013.01);
(Continued)

(58) Field of Classification Search
CPC . G10L 21/0308; G10L 21/0272; G10L 25/21; G10L 25/57; H04N 5/265;
(Continued)

(56) References Cited

U.S. PATENT DOCUMENTS 11,082,460 B2 * 8/2021 Nesta ..................... H04N 7/147
11,184,579 B2 * 11/2021 Honma ................ H04N 5/9202
(Continued)

FOREIGN PATENT DOCUMENTS

CN 106653008 A 5/2017
CN 107316650 A 11/2017
(Continued)

OTHER PUBLICATIONS

Liu, Alisa, Prem Seetharaman, and Bryan Pardo, "Model selection for deep audio source separation via clustering analysis", Jul. 2020, arXiv preprint arXiv:1910.12626. (Year: 2020).*
(Continued)

*Primary Examiner* — Daniel C Washburn
*Assistant Examiner* — James Boggs

(57) ABSTRACT

Embodiments of this application provide an audio processing method and apparatus. The method includes: A terminal device displays a first interface; when the terminal device receives an operation on a control for enabling recording, the terminal device displays a second interface and obtains a first audio signal; the terminal device performs sound source separation on the first audio signal to obtain N channels of audio signals, where N is an integer greater than or equal to 2; and the terminal device generates a first video and a second video, where when the N channels of audio signals satisfy a preset condition, the second video is obtained based on the N channels of audio signals and a second picture, and a target audio signal is an audio signal of a target object.

14 Claims, 10 Drawing Sheets

(51) Int. Cl.

| | |
|---|---|
| *G10L 25/21* | (2013.01) |
| *G10L 25/57* | (2013.01) |
| *H04N 5/265* | (2006.01) |
| *H04N 5/272* | (2006.01) |
| *H04N 21/439* | (2011.01) |
| *H04S 3/00* | (2006.01) |

(52) U.S. Cl.

CPC ............. *G10L 25/57* (2013.01); *H04N 5/265* (2013.01); *H04N 5/272* (2013.01); *H04N 21/439* (2013.01); *H04S 3/008* (2013.01); *H04S 2400/01* (2013.01); *H04S 2400/15* (2013.01)

(58) Field of Classification Search

CPC ...... H04N 5/272; H04N 21/439; H04S 3/008; H04S 2400/01; H04S 2400/15

See application file for complete search history.

(56) References Cited

U.S. PATENT DOCUMENTS

| | | | | |
|---|---|---|---|---|
| 11,756,570 B2 * | 9/2023 | Tzinis | ...................... | G10L 25/57 |
| | | | | 381/56 |
| 12,217,761 B2 * | 2/2025 | Chen | ........................ | G10L 25/78 |
| 12,375,796 B2 * | 7/2025 | Bian | .................... | G11B 27/105 |
| 2017/0309289 A1 * | 10/2017 | Eronen | .................. | H04R 1/406 |
| 2019/0222798 A1 | 7/2019 | Honma et al. | | |
| 2021/0337331 A1 | 10/2021 | Liu | | |
| 2023/0115929 A1 | 4/2023 | Bian et al. | | |
| 2023/0185518 A1 | 6/2023 | Yang et al. | | |
| 2024/0305890 A1 | 9/2024 | Liu et al. | | |

FOREIGN PATENT DOCUMENTS

| | | | |
|---|---|---|---|
| CN | 111081269 | A | 4/2020 |
| CN | 113203987 | A | 8/2021 |
| CN | 113365012 | A | 9/2021 |
| CN | 113573120 | A | 10/2021 |
| CN | 113747047 | A | 12/2021 |
| CN | 113948104 | A | 1/2022 |
| CN | 114038452 | A | 2/2022 |
| CN | 114363512 | A | 4/2022 |
| CN | 116095254 | A | 5/2023 |
| EP | 4192024 | A1 | 6/2023 |
| EP | 4054177 | B1 | 1/2024 |
| EP | 4383697 | A1 | 6/2024 |
| EP | 4383743 | A1 | 6/2024 |
| KR | 20180067920 | A | 6/2018 |

OTHER PUBLICATIONS

Michelsanti, Daniel, Zheng-Hua Tan, Shi-Xiong Zhang, Yong Xu, Meng Yu, Dong Yu, and Jesper Jensen, "An Overview of Deep-Learning-Based Audio-Visual Speech Enhancement and Separation", Apr. 2021, IEEE/ACM Transactions on Audio, Speech, and Language Processing, vol. 29, pp. 1368-1396. (Year: 2021).*

Liu, Ching-Feng, Wei-Siang Ciou, Peng-Ting Chen, and Yi-Chun Du, "A Real-Time Speech Separation Method Based on Camera and Microphone Array Sensors Fusion Approach", Jun. 2020, Sensors 2020, vol. 20, No. 12, Article 3527, pp. 1-15. (Year: 2020).*

Wei Ke-jing, et al: "A Method for Real-time Recognition of Thunder", Research and Exploration in Laboratory, vol. 34 No. 3, Mar. 2015, 4 pages.

* cited by examiner

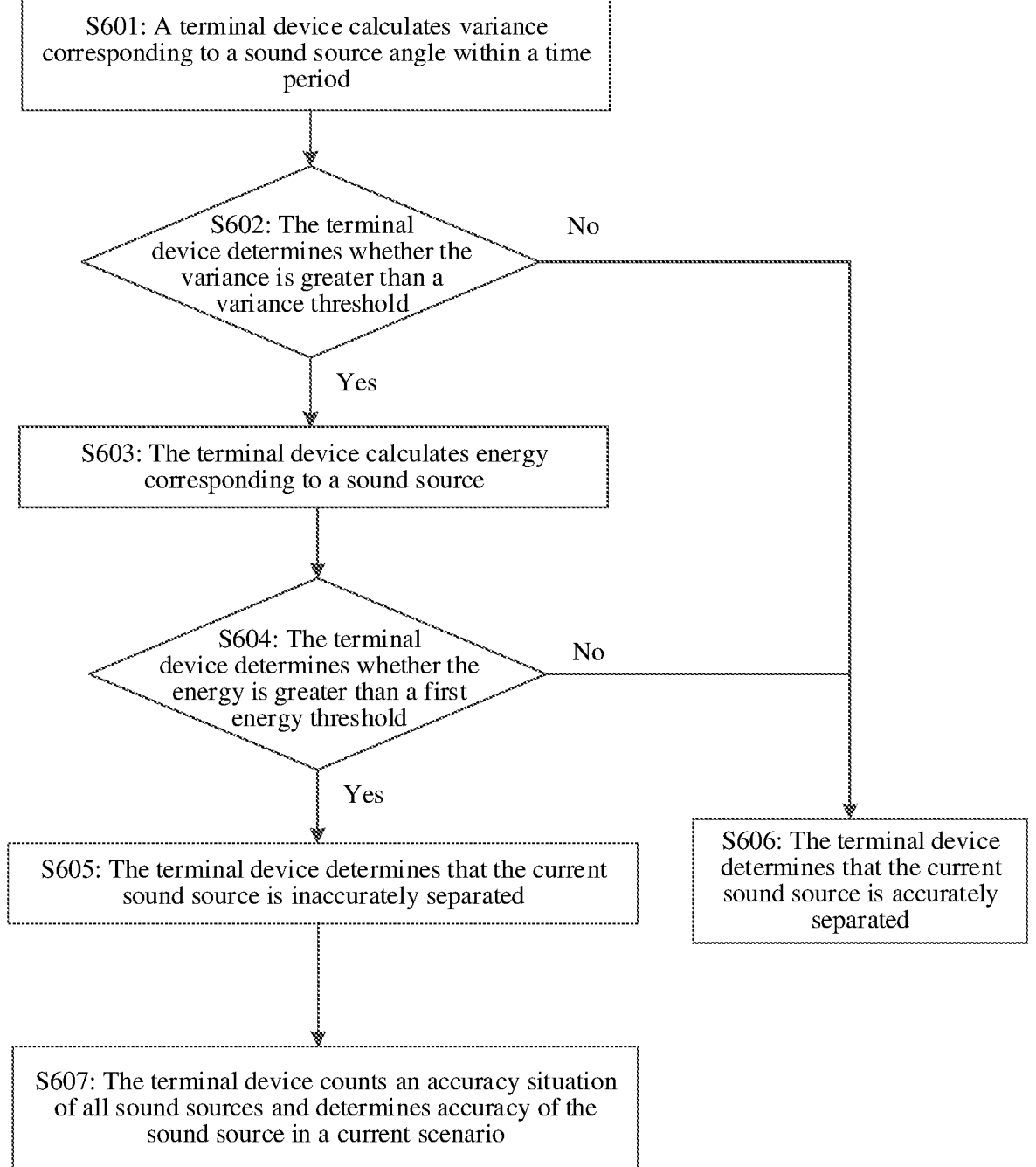

S601: A terminal device calculates variance corresponding to a sound source angle within a time period S602: The terminal device determines whether the variance is greater than a variance threshold No Yes S603: The terminal device calculates energy corresponding to a sound source S604: The terminal device determines whether the energy is greater than a first energy threshold No Yes S605: The terminal device determines that the current sound source is inaccurately separated S606: The terminal device determines that the current sound source is accurately separated S607: The terminal device counts an accuracy situation of all sound sources and determines accuracy of the sound source in a current scenario

FIG. 6

AUDIO PROCESSING METHOD AND APPARATUS

CROSS-REFERENCE TO RELATED APPLICATIONS

This application is a national stage of International Application No. PCT/CN2023/094896, filed on May 17, 2023, which claims priority to Chinese Patent Application No. 202210603382.1, filed on May 30, 2022. The disclosures of each of the aforementioned applications are hereby incorporated by reference in their entireties.

TECHNICAL FIELD

This application relates to the field of terminal technologies, and in particular, to an audio processing method and apparatus.

BACKGROUND

With the popularity and development of a terminal device, video shooting and production have become an indispensable part of our daily life and entertainment. In video shooting and playback scenarios, user's requirements for viewing of a video picture and hearing of a video and audio are increasing.

Generally, the terminal device can obtain N channels of audio signals by separating a sound source of a sound in a video shooting scenario, so that the N channels of audio signals can be used for voice enhancement, voice suppression, voice recognition, or human-computer interaction in a video processing process.

However, because the sound source of the video shooting scenario is complex and the sound source changes greatly, accuracy of an audio processing method is low, which in turn affects a video including the N channels of audio signals.

SUMMARY

An embodiment of this application provides an audio processing method and apparatus, so that a terminal device can obtain a first audio signal, and perform sound source separation on the first audio signal to obtain N channels of audio signals. Accuracy of sound source separation is determined for the N channels of audio signals. When it is determined that the N channels of audio signals satisfy a preset condition, a video that satisfies the needs of a user is generated based on the N channels of audio signals, and accuracy of a sound when the video is generated based on the N channels of audio signals is improved.

According to a first aspect, an embodiment of this application provides an audio processing method, including: A terminal device displays a first interface, where the first interface includes: a control for enabling recording: when the terminal device receives an operation on the control for enabling recording, the terminal device displays a second interface and obtains a first audio signal, where the second interface includes a first picture and a second picture, the second picture is overlaid on the first picture, and the first picture includes content in the second picture, and the second picture includes a target object: the terminal device performs sound source separation on the first audio signal to obtain N channels of audio signals, where N is an integer greater than or equal to 2; and the terminal device generates a first video and a second video, where the first video is obtained based on the first audio signal and the first picture, when the N channels of audio signals satisfy a preset condition, the second video is obtained based on the N channels of audio signals and the second picture, a second audio signal corresponding to the second video is obtained by processing a target audio signal in the N channels of audio signals and/or a signal other than the target audio signal in the N channels of audio signals, and the target audio signal is an audio signal of the target object. In this way, the terminal device can obtain the first audio signal and perform sound source separation on the first audio signal to obtain the N channels of audio signals. In addition, accuracy of separation of the N channels of audio signals is determined. When it is determined that the N channels of audio signals satisfy the preset condition, a video that satisfies the needs of a user is generated based on the N channels of audio signals, and accuracy of a sound when the video is generated based on the N channels of audio signals is improved.

The first interface can be an interface corresponding to a recording function; and the first picture can be a video interface, and the second picture can be a picture in picture overlaid on the first picture.

In a possible implementation, when the N channels of audio signals do not satisfy the preset condition, the second video is obtained based on the first audio signal and the second picture. In this way, the terminal device can generate the second video by using the first audio signal without sound source separation when the separation of the N channels of audio signals is inaccurate, to avoid that use of N channels of audio signals that are inaccurately separated affects an audio effect in the second video.

In a possible implementation, that the N channels of audio signals do not satisfy the preset condition includes: Energy of any one of the N channels of audio signals is greater than an energy threshold, and angle variance corresponding to an angle of the any audio signal within a time threshold is greater than a variance threshold; and/or the energy of the any audio signal is greater than the energy threshold and correlation of the any audio signal with another audio signal in the N channels of audio signals is greater than or equal to a correlation threshold. In this way, the terminal device can perform, based on a direction of the N channels of audio signals and energy of the N channels of audio signals, and/or the energy of the N channels of audio signals and correlation between the any channel of audio signal and another audio signal in the N channels of audio signals, accuracy analysis on N channels of audio signals obtained through sound source separation.

In a possible implementation, the angle of the any audio signal is obtained based on column data corresponding to the any audio signal in a demixing matrix and a transfer function of the terminal device at each preset angle. The demixing matrix is obtained by the terminal device performing sound source separation on the first audio signal. In this way, the terminal device can calculate the angle of the any audio signal based on the demixing matrix and a preset transfer function, so that the terminal device can perform accuracy analysis on sound source separation based on the angle of the any audio signal.

In a possible implementation, when a quantity of microphones in the terminal device is 2, a range of the preset angle is: 0°-180° or 180°-360°. In this way, a case can be avoided in which an angle of either audio signal cannot be determined because two microphones in the terminal device cannot recognize forward and backward directions of two microphone lines.

In a possible implementation, that the N channels of audio signals satisfy a preset condition includes: The energy of the any audio signal is greater than the energy threshold, and the angle variance corresponding to the angle of the any audio signal within the time threshold is less than or equal to the variance threshold; and/or the energy of the any audio signal is greater than the energy threshold and the correlation of the any audio signal with the another audio signal is less than the correlation threshold. In this way, the terminal device can perform, based on a direction of the N channels of audio signals and the energy of the N channels of audio signals, and/or the energy of the N channels of audio signals and correlation between the any channel of audio signal and another audio signal in the N channels of audio signals, accuracy analysis on N channels of audio signals obtained through sound source separation.

In a possible implementation, that when the terminal device receives an operation on the control for enabling recording, the terminal device displays a second interface and obtains a first audio signal includes: When the terminal device receives the operation on the control for enabling recording, the terminal device displays a third interface. The third interface includes the first picture, and the first picture includes the target object. When the terminal device receives an operation on the target object, the terminal device displays the second interface. In this way, the terminal device can flexibly choose to highlight the target object based on the user's triggering operation on the target object, and process a sound of the target object, to improve a stereoscopic sense of the sound of the target object.

In a possible implementation, the second interface further includes: a control for ending recording, where that the terminal device performs sound source separation on the first audio signal to obtain N channels of audio signals includes: When the terminal device receives an operation on the control for ending recording, the terminal device performs sound source separation on the first audio signal to obtain the N channels of audio signals. In this way, the terminal device can determine when to end the recording based on user's needs, and perform sound source separation processing on the first audio signal, to improve user's experience of using a recording function.

According to a second aspect, an embodiment of this application provides an audio processing apparatus, including: a display unit and a processing unit. The display unit is configured to display a first interface. The first interface includes: a control for enabling recording. When the terminal device receives an operation on the control for enabling recording, the display unit is further configured to enable the terminal device to display a second interface and obtain a first audio signal. The second interface includes a first picture and a second picture, the second picture is overlaid on the first picture, and the first picture includes content in the second picture. The second picture includes a target object. The processing unit is configured to perform sound source separation on the first audio signal to obtain N channels of audio signals. N is an integer greater than or equal to 2. The processing unit is further configured to generate a first video and a second video. The first video is obtained based on the first audio signal and the first picture. When the N channels of audio signals satisfy a preset condition, the second video is obtained based on the N channels of audio signals and the second picture. A second audio signal corresponding to the second video is obtained by processing a target audio signal in the N channels of audio signals and/or a signal other than the target audio signal in the N channels of audio signals. The target audio signal is an audio signal of the target object.

In a possible implementation, when the N channels of audio signals do not satisfy the preset condition, the second video is obtained based on the first audio signal and the second picture.

In a possible implementation, that N channels of audio signals do not satisfy the preset condition includes: Energy of any one of the N channels of audio signals is greater than an energy threshold, and angle variance corresponding to an angle of the any audio signal within a time threshold is greater than a variance threshold; and/or the energy of the any audio signal is greater than the energy threshold and correlation of the any audio signal with another audio signal in the N channels of audio signals is greater than or equal to a correlation threshold.

In a possible implementation, the angle of the any audio signal is obtained based on column data corresponding to the any audio signal in a demixing matrix and a transfer function of the terminal device at each preset angle. The demixing matrix is obtained by the terminal device performing sound source separation on the first audio signal.

In a possible implementation, when a quantity of microphones in the terminal device is 2, a range of the preset angle is: 0°-180° or 180°-360°.

In a possible implementation, that the N channels of audio signals satisfy a preset condition includes: The energy of the any audio signal is greater than the energy threshold, and the angle variance corresponding to the angle of the any audio signal within the time threshold is less than or equal to the variance threshold; and/or the energy of the any audio signal is greater than the energy threshold and the correlation of the any audio signal with the another audio signal is less than the correlation threshold.

In a possible implementation, when the terminal device receives the operation on the control for enabling recording, the display unit in the terminal device is specifically configured to display a third interface. The third interface includes the first picture, and the first picture includes the target object. When the terminal device receives an operation on the target object, the display unit is further specifically configured to display the second interface.

In a possible implementation, the second interface includes: a control for ending recording. When the terminal device receives an operation on the control for ending recording, the processing unit is specifically configured to perform sound source separation on the first audio signal to obtain the N channels of audio signals.

According to a third aspect, an embodiment of this application provides a terminal device, including a processor and a memory, where the memory is configured to store code instructions. The processor is configured to run the code instructions, so that the terminal device performs the method according to the first aspect or any one of implementations of the first aspect.

According to a fourth aspect, an embodiment of this application provides a computer-readable storage medium. The computer-readable storage medium stores instructions. The instructions, when executed, enables a computer to perform the method according to the first aspect or any one of implementations of the first aspect.

According to a fifth aspect, a computer program product is provided, including a computer program. The computer program, when run, enables a computer to perform the method according to the first aspect or any one of implementations of the first aspect.

It should be understood that the second aspect to the fifth aspect of this application correspond to the technical solution of the first aspect of this application, and the beneficial effects obtained by each aspect and the corresponding feasible implementations are similar. Details are not described herein again.

BRIEF DESCRIPTION OF DRAWINGS

FIG. 6 is a schematic flowchart of accuracy analysis of a sound source according to an embodiment of this application:

DESCRIPTION OF EMBODIMENTS

Figure 1:
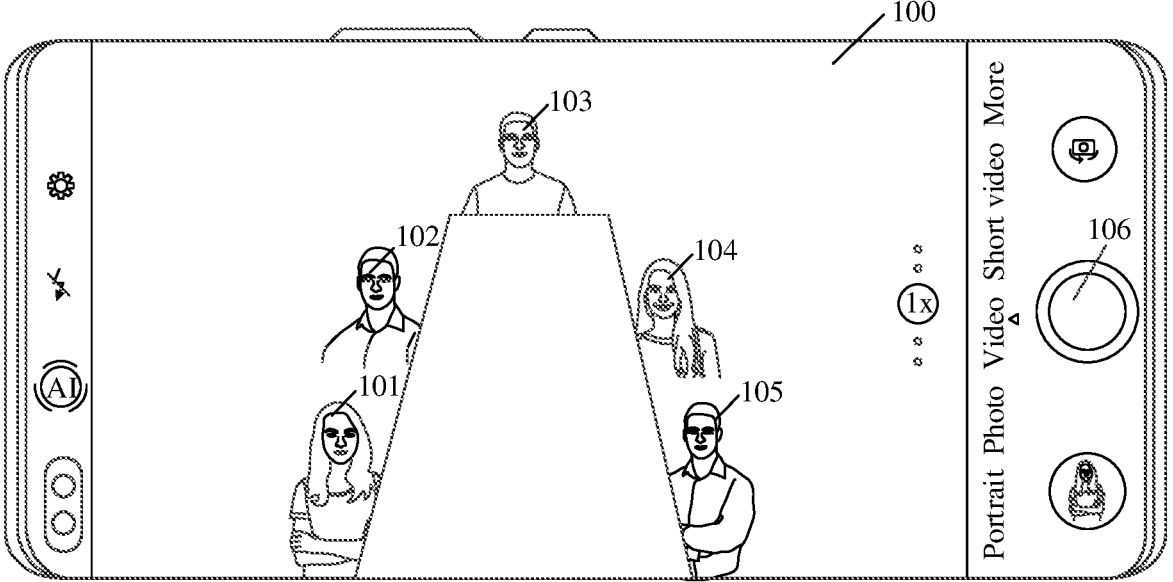
FIG. 1 is a schematic diagram of an interface in a recording scenario according to an embodiment of this application.

The vocabularies described in embodiments of this application are described below. It can be understood that this description is intended to provide a clearer explanation of embodiments of this application and does not necessarily constitute a limitation to embodiments of this application.

(1) Blind Source Separation (Blind Source Separation, BSS)

In embodiments of this application, blind source separation can also be referred to as blind signal separation or sound source separation, which can be a method for separating a source signal from a received mixed signal without knowing the source signal and a mixed parameter of the signal.

The method for separating a sound source may include: an independent vector analysis (Independent vector analysis, IVA) method, an independent component analysis (Independent Component Analysis, ICA) method, a non-negative matrix factorization (non-negative matrix factorization, NMF) method, a multichannel non-negative matrix factorization (multichannel NMF, MNMF) method, or the like.

(2) Suppression

Suppression refers to decreasing energy of an audio signal, so that the audio signal sounds small or even inaudible. A suppression degree is used to describe an extent to which the audio signal is decreased. The greater the suppression degree, the more the energy of the audio signal decreases.

The suppression degree can be represented by using a gain coefficient. When the gain coefficient is 0.0, it represents that the audio signal is completely removed: when the gain coefficient is 1.0, it represents that no suppression is performed: or when the gain coefficient is greater than 1.0, it represents that the audio signal is enhanced. The closer to 0.0, the greater the suppression degree, and the closer to 1.0, the smaller the suppression degree.

(3) Picture-In-Picture

Picture-in-picture means that a display screen of a terminal device is divided into two display interfaces, one large and one small, and the smaller display interface is included in the larger display interface.

A larger display area generally covers the screen of the device, and an image in a smaller display area can be overlaid on an image in a larger display area. In some cases, the smaller display area also supports scaling, and a location of the small display area in the screen of the terminal device can also be changed.

For ease of describing the technical solutions in embodiments of this application clearly, in embodiments of this application, words such as "first" and "second" are used to distinguish same or similar items with a basically same function and role. For example, a first value and a second value are merely used to distinguish between different values, and are not intended to limit a sequence thereof. A person skilled in the art may understand that the terms "first", "second", and the like, and do not limit a quantity and an execution order, and the terms "first", "second", and the like are not limited to be necessarily different.

It should be noted that, in this application, the term "exemplarily" or "for example" is used to represent giving an example, an illustration, or a description. Any embodiment or design scheme described as "exemplarily" or "for example" in this application should not be explained as being more preferred or having more advantages than another embodiment or design scheme. In particular, the terms such as "exemplarily" and "for example" are intended to present a related concept in a specific manner.

In this application, "at least one" refers to one or more, and "a plurality of" refers to two or more. The term "and/or" describes an association relationship for describing associated objects and represents that three relationships may exist. For example, A and/or B may represent the following three cases: only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural.

FIG. 1 is a schematic diagram of an interface in a recording scenario according to an embodiment of this application. As shown in FIG. 1, the recording scenario may be a meeting scenario. For example, when a user uses a terminal device to record the meeting scenario, the interface shown in FIG. 1 can be shot. In the embodiment corresponding to FIG. 1, exemplary descriptions are made by using an example in which the terminal device is a mobile phone, and this example does not constitute a limitation to embodiments of this application.

When the terminal device receives an operation of the user opening a camera application and an operation of triggering entering a recording function, the terminal device can display the interface shown in a in FIG. 1. As shown in FIG. 1, the interface may include: a preview picture 100, a control for enabling or closing a flash light, a setting control for setting the camera application, a control for adjusting a shooting multiple, a control for flipping a camera, a control for opening a gallery, a control 106 for enabling recording corresponding to the recording function, and a plurality of function controls in a primary menu of the camera application. The plurality of function controls in the primary menu of the camera application may include: a portrait function control, a shooting function control, a recording function control, a short video function control, a control for enabling more functions, and the like.

The preview picture 100 as shown in FIG. 1 may include: targets 101, 102, 103, 104, and 105 around a conference table. In the meeting scenario shown in FIG. 1, the terminal device can record a video of the meeting scenario and extract a sound source to one target in the scenario by using an audio processing method. Due to cases in which there may be many sound sources in the scenario, and/or energy of a sound source may be large or small, accuracy of sound source separation may be affected when the terminal device extracts a sound source of one target, and then this affects another audio processing process after sound source separation processing.

In view of this, embodiments of this application provide an audio processing method, and the terminal device displays a first interface. The first interface includes: a control for enabling recording. When the terminal device receives an operation on the control for enabling recording, the terminal device displays a second interface and obtains a first audio signal. The second interface includes a first picture and a second picture, the second picture is overlaid on the first picture, and the first picture includes content in the second picture. The second picture includes a target object. The terminal device performs sound source separation on the first audio signal to obtain N channels of audio signals. N is an integer greater than or equal to 2. The terminal device generates a first video and a second video. The first video is obtained based on the first audio signal and the first picture. When the N channels of audio signals satisfy a preset condition, the second video is obtained based on the N channels of audio signals and the second picture. In this way, the terminal device can use the N channels of audio signals where a sound source is accurately separated for generating the second video. A second audio signal corresponding to the second video is obtained by processing a target audio signal in the N channels of audio signals and/or a signal other than the target audio signal in the N channels of audio signals, so that the terminal device can increase a stereoscopic sense of a sound source of the target object in the second video by processing different audio signals in the accurate N channels of audio signals obtained through sound source separation.

It can be understood that the audio processing method provided in embodiments of this application can be applied to the recording scenario as shown in FIG. 1, and to a scenario involving sound source separation such as a live broadcast scenario. This is not limited in embodiments of this application.

It may be understood that, the above terminal device may also be referred to as a terminal (terminal), a user equipment (user equipment, UE), a mobile station (mobile station, MS), a mobile terminal (mobile terminal, MT), or the like. The terminal device may be a mobile phone (mobile phone) having a MIC, a smart TV, a wearable device, a tablet computer (Pad), a computer having a wireless transmission and receiving function, a virtual reality (Virtual Reality, VR) terminal device, an augmented reality (augmented reality, AR) terminal device, a wireless terminal related to industrial control (industrial control), a wireless terminal related to self-driving (self-driving), a wireless terminal related to remote medical surgery (remote medical surgery), a wireless terminal related to a smart grid (smart grid), a wireless terminal related to transportation safety (transportation safety), a wireless terminal related to a smart city (smart city), a wireless terminal related to a smart home (smart home), or the like. Embodiments of this application impose no limitation on a specific technology and a specific device form used by the terminal device.

Figure 2:
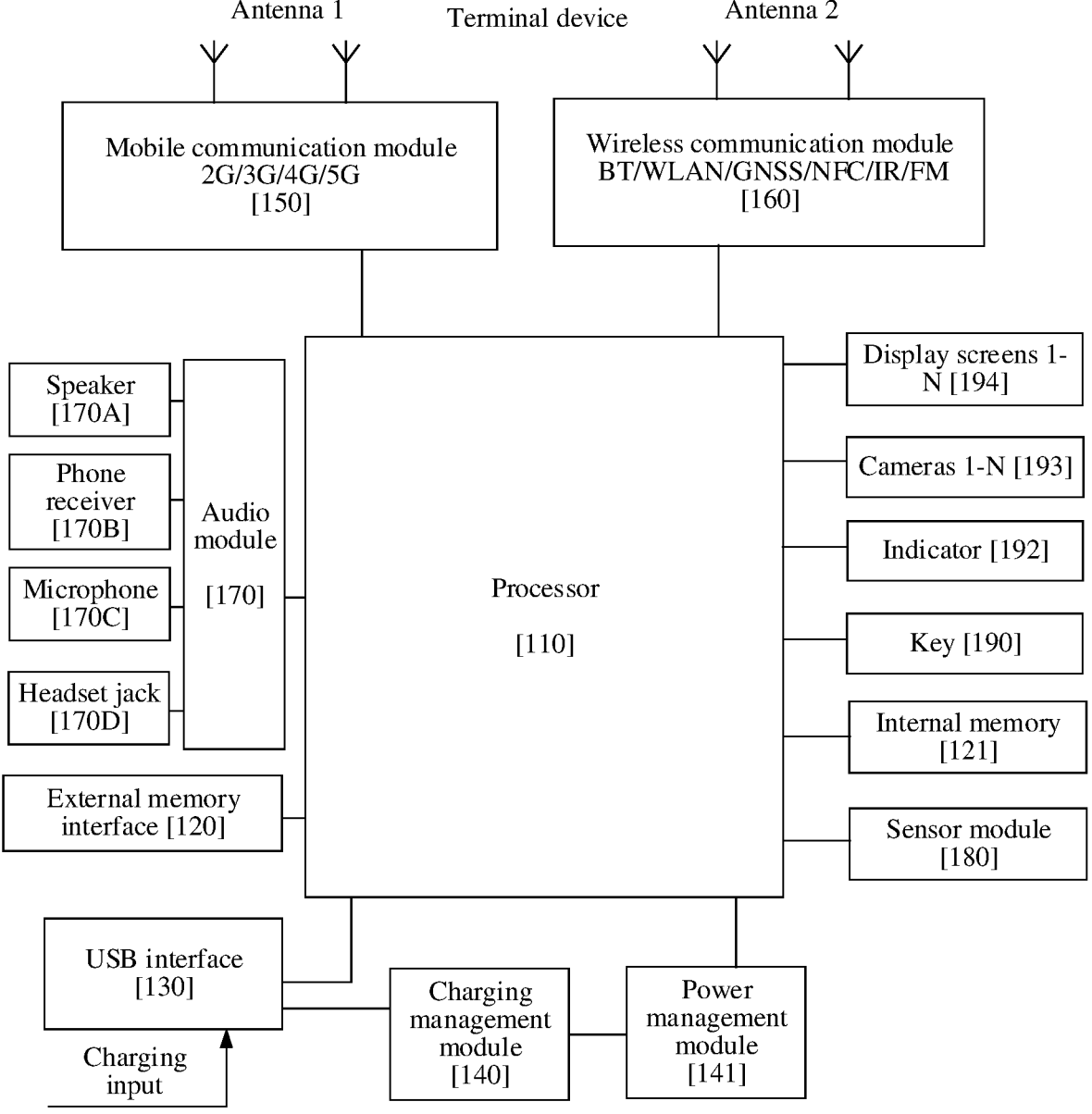
FIG. 2 is a schematic diagram of a structure of a terminal device according to an embodiment of this application.

To better understand embodiments of this application, the following describes a structure of the terminal device in embodiments of this application. For example, FIG. 2 is a schematic diagram of a structure of a terminal device according to an embodiment of this application.

The terminal device may include a processor 110, an external memory interface 120, an internal memory 121, a universal serial bus (universal serial bus, USB) interface 130, a charging management module 140, a power management module 141, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, an indicator 192, a camera 193, a display screen 194, and the like.

It may be understood that an example structure in this embodiment of this application does not constitute a specific limitation on the terminal device. In some other embodiments of this application, the terminal device may include more or fewer components than those shown in the figure, or combine some components, or split some components, or have different component arrangements. The components in the figure may be implemented by hardware, software, or a combination of software and hardware.

The processor 110 may include one or more processing units. Different processing units may be independent components, or may be integrated into one or more processors. A memory may also be disposed in the processor 110, configured to store instructions and data.

The USB interface 130 is an interface that complies with the USB standard specification, and may be specifically a Mini USB interface, a Micro USB interface, a USB Type C interface, and the like. The USB interface 130 may be configured to connect to a charger to charge the terminal device, or may be used for data transmission between the terminal device and a peripheral device. The USB interface 130 may also be configured to connect to a headset to play audio through the headset. The interface may alternatively be configured to connect to another terminal device such as an AR device.

The charging management module 140 is configured to receive charging input from a charger. The charger may be a wireless charger or a wired charger. The power management module 141 is configured to connect to the charging management module 140 and the processor 110.

A wireless communication function of the terminal device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. An antenna in the terminal device may be configured to cover a single communication frequency band or a plurality of communication frequency bands. Different antennas may further be multiplexed to improve utilization of the antennas.

The mobile communication module 150 may provide a solution to wireless communication including 2G/3G/4G/5G applied to the terminal device. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation.

The wireless communication module 160 may provide a solution for wireless communication including wireless local area networks (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), and the like applied to the terminal device.

The terminal device implements a display function by using a GPU, the display screen 194, an application processor, and the like. The GPU is a microprocessor for image processing and connects the display screen 194 and the application processor. The GPU is configured to perform mathematical and geometric calculations, and is configured to render graphics.

The display screen 194 is configured to display an image, a video, and the like. The display screen 194 includes a display panel. In some embodiments, the terminal device may include 1 or N display screens 194. N is a positive integer greater than 1.

The terminal device may implement a shooting function by using an ISP, the camera 193, the video codec, the GPU, the display screen 194, the application processor, and the like.

The camera 193 is configured to capture a still image or video. In some embodiments, the terminal device may include one or N cameras 193, where N is a positive integer greater than 1.

The external memory interface 120 may be configured to connect to an external storage card such as a Micro SD card, to extend a storage capability of the terminal device. The external storage card communicates with the processor 110 by using the external memory interface 120, to implement a data storage function. For example, files such as music and a video are stored in the external storage card.

The internal memory 121 may be configured to store computer executable program code, where the executable program code includes an instruction. The internal memory 121 may include a program storage area and a data storage area.

The terminal device may implement an audio function by using the audio module 170, the speaker 170A, the phone receiver 170B, the microphone 170C, the headset jack 170D, the application processor, and the like, for example, music playback, recording, and the like.

The audio module 170 is configured to convert digital audio information into analog audio signal output, and is also configured to convert analog audio input into a digital audio signal. The speaker 170A, also referred to as a "horn", is configured to convert an electrical audio signal into a sound signal. Music can be listened to or a hands-free call can be answered by using the speaker 170A in the terminal device. The phone receiver 170B, also referred to as a "handset", is configured to convert an electrical audio signal into a sound signal. When a call is answered or audio information is listened to by using the terminal device, the phone receiver 170B may be put close to a human ear to listen to a voice. The headset jack 170D is configured to be connected to a wired headset.

The microphone (microphone, MIC) 170C, also referred to as a "microphone" or a "microphone", is configured to convert a sound signal into an electrical signal. In embodiments of this application, the terminal device may receive the sound signal based on the microphone 170C and convert the sound signal into an electrical signal that can be subsequently processed, and the terminal device may have at least two microphones 170C.

In embodiments of this application, the microphone 170C may obtain an audio signal within a 360° range centered on the terminal device.

The sensor module 180 may include one or more of the following sensors, for example: a pressure sensor, a gyro sensor, a barometric pressure sensor, a magnetic sensor, an acceleration sensor, a distance sensor, an optical proximity sensor, a fingerprint sensor, a temperature sensor, and a touch sensor, an ambient light sensor, a bone conduction sensor (not shown in FIG. 2), and the like.

The key 190 includes a power key, a volume key, and the like. The key 190 may be a mechanical key, or a touch-type key. The terminal device may receive key input, generate key signal input related to a user setting and function control of the terminal device. The indicator 192 may be an indicator light that may be configured to indicate a charging state and a power change, or may be configured to indicate a message, a missed call, a notification, and the like.

A software system of the terminal device may use a layered architecture, an event-driven architecture, a micro-kernel architecture, a micro service architecture, or a cloud architecture like. Details are not described herein again.

The following describes the technical solutions of this application and how to resolve the foregoing technical problems according to the technical solutions of this application in detail by using specific embodiments. The following several specific embodiments may be independently implemented, and may also be combined with each other, and the same or similar concepts or processes may not be described repeatedly in some embodiments.

In an embodiment of this application, the terminal device may support audio and video processing methods in a picture-in-picture mode. For example, FIG. 3 is a schematic diagram of interfaces in another recording scenario according to an embodiment of this application.

Figure 3:
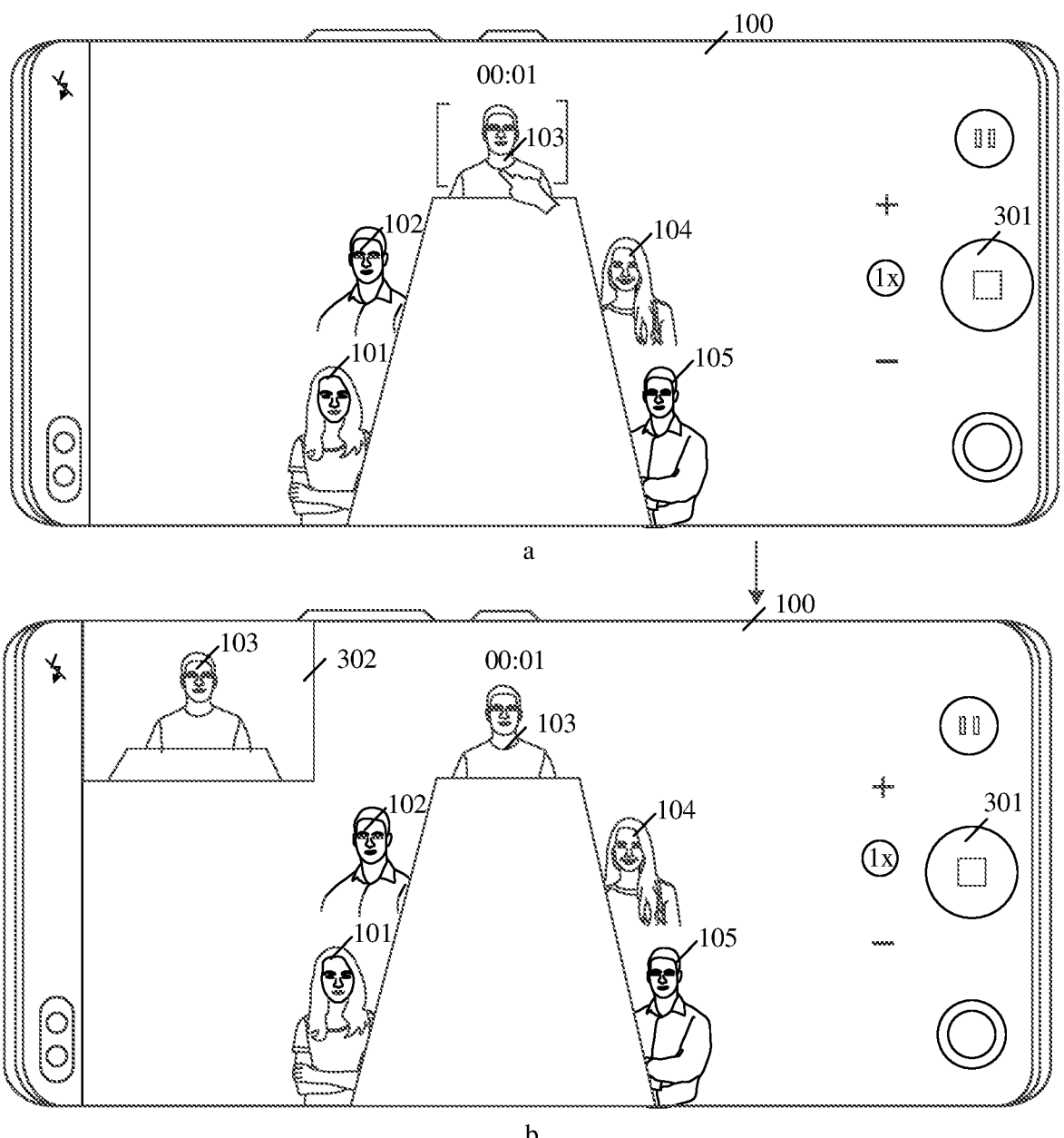
FIG. 3 is a schematic diagram of interfaces in another recording scenario according to an embodiment of this application.

When a terminal device receives a triggering operation of a user on a control 106 for enabling recording in an interface shown in FIG. 1, the terminal device may display an interface shown in a in FIG. 3. A shown in the interface shown in a in FIG. 3, the interface may include: a control for pausing recording, a control 301 for ending recording, a control for shooting a picture during a recording process, a control for enlarging a picture, a control for shrinking the picture, identification for indicating a time period for video recording, and the like. The triggering operation may include: a single-tap operation, a double-tap operation, or a long-press operation. This is not limited in this embodiment of this application.

For example, when the terminal device supports the picture-in-picture mode and receives a triggering operation on a target 103 in the interface shown in a in FIG. 3, the terminal device extracts a preview picture including the target 103 and displays an interface shown in b in FIG. 3. A shown in the interface shown b in FIG. 3, the interface may include a picture in picture 302, and the picture in picture 302 may include the target 103.

It can be understood that in the interface shown in b in FIG. 3, the picture in picture 302 can be overlaid on the preview picture 100, and the picture in picture 302 can be located in an upper left corner of the preview picture 100, or can be located in another location. A location of the picture in picture 302 is not defined in this embodiment of this application.

In a possible implementation, the terminal device can detect a sound source with the highest energy in the current scenario when the terminal device supports the picture-in-picture mode. When the sound source with the highest energy is a sound source of the target 103, the terminal device can extract the preview picture including the target 103 and display the interface as shown in b in FIG. 3.

In the interface shown in b in FIG. 3, when the terminal device receives a triggering operation of the user on the control 301 for ending recording, the terminal device can obtain a video corresponding to the preview picture 100 based on an audio signal obtained by using a microphone and the preview picture 100. What's more, sound source separation is performed on the audio signal obtained by using the microphone to obtain N channels of audio signals, an audio signal at an angle corresponding to the target 103 in the N channels of audio signals and a sound source other than the target 103 in the N channels of audio signals are processed, and then a video corresponding to the picture in picture 302 is obtained based on processed N channels of audio signals and the picture in picture 302.

Embodiments of this application provide two audio processing methods according to the embodiment corresponding to FIG. 3, for example: Method 1: an audio processing method based on sound source orientation estimation; and Method 2: an audio processing method based on determining sound source correlation.

Figure 4:
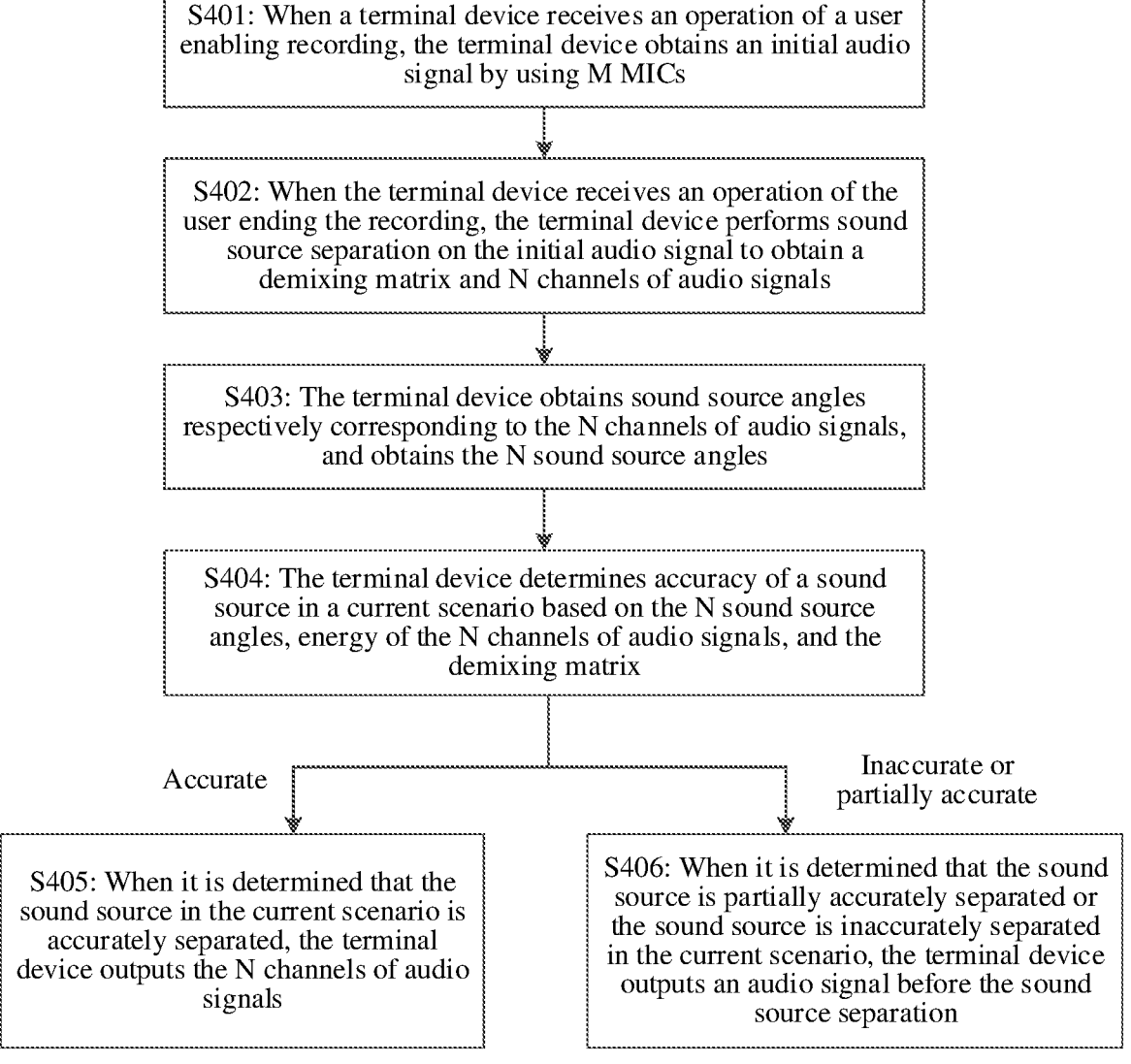
FIG. 4 is a schematic flowchart of an audio processing method according to an embodiment of this application.

Method 1: The Audio Processing Method Based on Sound Source Orientation Estimation For example, FIG. 4 is a schematic flowchart of an audio processing method according to an embodiment of this application. As shown in FIG. 4, the audio processing method may include the following steps.

S401: When a terminal device receives an operation of a user enabling recording, the terminal device obtains an initial audio signal by using M MICs.

In this embodiment of this application, M is greater than or equal to 2, and the M MICs may include: at least two MICs in the terminal device. Alternatively, when the terminal device establishes a connection with a true wireless stereo (true wireless stereo, TWS) headset, the M MICs may also include: at least two MICs in the TWS headset, and/or at least two MICs in the terminal device. A specific form of the MIC that collects the initial audio signal is not limited in this embodiment of this application.

In this embodiment of this application, the operation of the user enabling recording may be: a triggering operation, a voice operation, or another gesture operation of the user on a control for enabling recording. This is not limited in this embodiment of this application.

For example, in an interface as shown in FIG. 1, when the terminal device receives the triggering operation of the user on the control 106 for enabling recording, the terminal device can use a camera to obtain an image signal to display a recording interface as shown in a in FIG. 3, and use the M MICs to obtain the initial audio signal.

S402: When the terminal device receives an operation of the user ending the recording, the terminal device performs sound source separation on the initial audio signal to obtain a demixing matrix and N channels of audio signals.

This embodiment of this application summarizes that the operation of ending the recording may be: a triggering operation, a voice operation, or another gesture operation of the user on a control for ending recording. This is not limited in this embodiment of this application.

For example, in an interface as shown in b in FIG. 3, when the terminal device receives the triggering operation of the user on the control 301 for ending recording, the terminal device performs sound source separation on the initial audio signal to obtain the demixing matrix and the N channels of audio signals.

In this embodiment of this application, the terminal device may perform Fourier transform on the obtained initial audio signal in time domain in S401, and convert the initial audio signal into an initial audio signal in frequency domain. Then, sound source separation is performed on the initial audio signal in frequency domain to obtain the demixing matrix and the N channels of audio signals. A method of sound source separation may be IVA, or the like.

For example, if a quantity of sound sources in a current scenario is N, a time domain sequence of the sound sources can be represented as: $s_{1(t)}, s_{2(t)}, \ldots, s_{N(t)}$. s represents a source signal (source) and t represents a sample sequence of time. Assuming that the M MICs collect the initial audio signal, an audio signal corresponding to each sound source obtained by the terminal device can be represented as respectively $x_{1(t)}, x_{2(t)} \ldots, x_{M(t)}$.

It can be understood that a sound wave from the sound source to the MIC need to go through a transmission path (such as a time delay, reflection, and mixing generated by different sound sources entering the same MIC). Therefore, a relationship between the source signal $s_{n(t)}$ and the audio signal $x_{m(t)}$ collected by the MIC is represented in time domain as follows:

$$x_{m(t)} = \sum_{n=1}^{N} \sum_{\tau=0}^{L-1} h_{mn}(\tau) s_n(t - \tau), m = 1, \ldots, M \qquad \text{Formula (1)}$$

$s_{n(t)}$ is an $n^{th}$ sound source, $x_{m(t)}$ is an audio signal picked up by an $m^{th}$ MIC, $\tau$ is a time delay, L is a maximum time delay, and h can be understood as a transmission path between the source signal $s_{n(t)}$ and the signal $x_{m(t)}$ collected by the MIC.

Further, the terminal device can perform Fourier transform on Formula (1), and a frequency-domain relationship between the source signal s and the signal x collected by the MIC can be obtained:

$$x(\omega, t) = A(\omega, t) s(\omega, t) \qquad \text{Formula (2)}$$

If N is a quantity of sound sources and M is a quantity of MICs, x is a vector with a length of M, s is a vector with a length of N, $\omega$ is frequency, t is a quantity of frames, A is a matrix with M rows and N columns, or can be understood as the transmission path between the source signal s and the signal x collected by the MIC.

$$W(\omega, t) x(\omega, t) = s(\omega, t) \qquad \text{Formula (3)}$$

W may be a matrix with N rows and M columns, or may also be referred to as a demixing matrix. For other parameters in Formula (3), refer to the descriptions in Formula (2). Details are not described herein again.

It can be understood that when the quantity M of MICs is greater than an actual quantity N of sound sources, (M–N) channels of sound sources may be noise. When the quantity of MICs is less than the actual quantity N of sound sources, separation can be performed based on the M sound sources, but separation quality is difficult to guarantee. Therefore, the terminal device in this embodiment of this application can enable the actual quantity N of sound sources and the quantity M of MICs to be the same in a process of performing a sound source processing method.

S403: The terminal device obtains sound source angles respectively corresponding to the N channels of audio signals, and obtains the N sound source angles.

For example, the terminal device can obtain a transfer function corresponding to each preset angle around the terminal device, and use a column vector corresponding to any sound source in the demixing matrix and the transfer function corresponding to the preset angle to obtain a dimensionless value of the sound source at any angle, and then count a minimum value of the dimensionless value at each angle of the terminal device as a direction (or an angle) of the sound source.

It can be understood that there may be differences in a layout of MICs in different terminal devices, so that there are differences in received audio signals at each preset angle. Therefore, a transfer function respectively corresponding to each preset angle of the terminal device can indicate a relative relationship between received audio signals at different angles.

Figure 5:
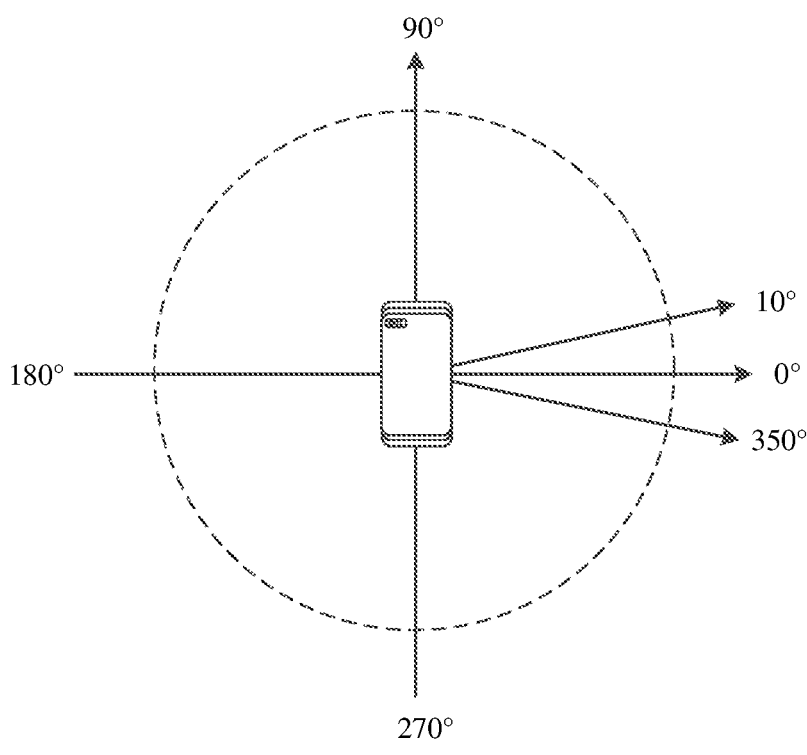
FIG. 5 is a schematic diagram of spatial angle division according to an embodiment of this application.

In this embodiment of this application, a transfer function corresponding to each preset angle can be stored in the terminal device. For example, FIG. 5 is a schematic diagram of spatial angle division according to an embodiment of this application. In the embodiment corresponding to FIG. 5, a preset angle can be 0°, 10°, 20°, . . . , 350°. For example, the terminal device is taken as the center, and in 360° directions around the terminal device, a test audio signal is collected every 10°. For example, a test audio signal is respectively collected in 0°, 10°, 20°, . . . , 350° directions, and then 36 test audio signals corresponding to 36 directions are obtained.

The method for obtaining the transfer function corresponding to each preset angle of the terminal device may be: When a quantity of MICs in the terminal device is M, Fourier transform is performed on a test audio signal in time domain obtained by M MICs to obtain a corresponding test audio signal in frequency domain.

$$Y_{(\omega,q)} = [X_1(\omega, q), \dots , X_M(\omega, q)] \qquad \text{Formula (4)}$$

$Y_{(\omega,q)}$ is an audio signal of the MIC at a frame q and a frequency $\omega$.

The terminal device can use a test audio signal obtained by any MIC, for example, a test audio signal $X_1(\omega, q)$ at the first MIC (or referred to as a reference MIC) is taken as a reference audio signal, to obtain a relationship $H_{(\theta,\omega)}$ between a test audio signal collected by another MIC and the reference audio signal at the reference MIC.

$$Y_{(\omega,q)} = [X_1(\omega, q), \dots , X_M(\omega, q)] = H_{(\theta,\omega)}X_1(\omega, q) \qquad \text{Formula (5)}$$

$$H_{(\theta,\omega)} = [1, \rho_{1,2}, \dots , \rho_{1,m}] \qquad \text{Formula (6)}$$

$\rho_{1,m}$ is a transfer function relationship between an audio signal $X_m(\omega, q)$ of an $m^{th}$ MIC and the audio signal $X_1(\omega, q)$ of the reference MIC.

$$X_m(\omega, q) = \rho_{1,m}^* X_1(\omega, q) \qquad \text{Formula (7)}$$

$$\rho_{1,m}(\omega, q) = \frac{E[X_1(\omega, q)X_m^*(\omega, q)]}{E[|X_1(\omega, q)|^2]} \qquad \text{Formula (8)}$$

\* represents a conjugate calculation and E represents an expected calculation.

Then, a transfer function whose angle is $\theta$ and whose frequency is w is obtained:

$$H_{(\theta,\omega)} = [1, \rho_{1,2}, \dots , \rho_{1,m}], \theta = 0, 10, 20, \dots , 350 \qquad \text{Formula (9)}$$

It can be understood that the terminal device can store obtained $H_{(\theta,\omega)}$ corresponding to each preset angle in the device, so that the terminal device can perform subsequent sound source orientation estimation based on $H_{(\theta,\omega)}$. Moreover, the device that obtains $H_{(\theta,\omega)}$ may not be limited to the terminal device, and the device may be, such as a server, or the like. This is not limited in this embodiment of this application.

For example, a method of sound source orientation estimation by using $H_{(\theta,\omega)}$ may be: Dot-product multiplication is performed on a transfer function $H_1(\omega)$ corresponding to any preset angle and one column $w^H$ of a demixing matrix to obtain $\gamma$. Each column in the demixing matrix may correspond to one sound source.

$$\gamma = \sum_{\omega=\omega_1=}^{\omega_2} w^H H_1(\omega) \qquad \text{Formula (10)}$$

$\omega_2 > \omega_1$, and $\omega_1 - \omega_2$ may be any frequency band range.

$$\gamma = \begin{bmatrix} w_{\omega,n}^1 & w_{\omega,n}^2 & w_{\omega,n}^1 \end{bmatrix} \begin{bmatrix} H_\omega^1 \\ H_\omega^2 \\ H_\omega^3 \end{bmatrix} \qquad \text{Formula (11)}$$

Further, an accumulated value of $\gamma$ of $\omega$ in all frequency band ranges are obtained at a fixed sound source and in a fixed direction to obtain a dimensionless value $v_\theta$.

$$\theta = \arg\min v_\theta \qquad \text{Formula (12)}$$

For $v_\theta$ corresponding to all angles of 0°-350°, a corresponding angle when $v_\theta$ is a minimum is selected as a direction $\theta$ of a sound source.

It can be understood that when a quantity of MICs is 2, it is impossible to distinguish between a forward direction and a backward direction of connection the two MICs, so that $\theta$ may satisfy: $0° \leq \theta \leq 180°$ or $180° \leq \theta \leq 360°$. When the quantity of MICs is greater than 2, the terminal device has no requirement for $\theta$.

Based on this, the terminal device can obtain the N sound source angles respectively corresponding to the N audio signals.

In a possible implementation, in the interface shown in b in FIG. 3, the terminal device can determine, based on the angle of the target 103 determined through image recognition and angles respectively corresponding to the N sound source angles in the step shown in S404, the sound source of the target 103 when the angle of the target 103 matches any one of the N sound source angles.

S404: The terminal device determines accuracy of the sound source in the current scenario based on the N sound source angles and energy of the N channels of audio signals.

In this embodiment of this application, when the terminal device determines that each sound source in the current scenario is accurately separated, the terminal device may perform the step shown in S405. When the terminal device determines that the sound sources in the current scenario are partly accurate (or it can be understood that part of the sound sources are accurately separated and part of the sound sources are inaccurately separated), the terminal device may perform the step shown in S406. Alternatively, when the terminal device determines that the sound sources in the current scenario are all inaccurately separated, the terminal device may perform the step shown in S406.

The terminal device can determine accuracy of separation of any one of the N channels of audio signals according to the embodiment corresponding to FIG. 6, and then output an accuracy situation of the sound source in the current scenario.

FIG. 6 is a schematic flowchart of accuracy analysis of a sound source according to an embodiment of this application. As shown in FIG. 6, a method of accuracy analysis of the sound source may include the following steps.

S601: A terminal device calculates variance corresponding to a sound source angle within a time period.

The time period may be 5 seconds, 10 seconds, 20 seconds, or the like. The sound source angle may be any one of N sound source angles.

It can be understood that because the variance of the sound source angle can reflect a degree of change in a direction of the sound source within the time period, and it is generally difficult for the direction of the sound source to change drastically within small time, the terminal device can determine accuracy of the sound source by using the variance of the sound source angle.

S602: The terminal device determines whether the variance is greater than a variance threshold.

When the terminal device determines that the variance is greater than the variance threshold, the terminal device may perform the step shown in S603. Alternatively, when the terminal device determines that the variance is less than or equal to the variance threshold, the terminal device may perform the step shown in S606.

S603: The terminal device calculates energy corresponding to the sound source.

The sound source may be any one of N channels of audio signals. The energy corresponding to the sound source may be energy corresponding to any one of the N channels of audio signals.

In a possible implementation, the terminal device can also count average energy of sound sources within the time period, and determine the accuracy of the sound source based on the average energy.

S604: The terminal device determines whether the energy is greater than a first energy threshold.

When the terminal device determines that the energy is greater than the first energy threshold, the terminal device may perform the step shown in S605. Alternatively, when the terminal device determines that the energy is less than or equal to the first energy threshold, the terminal device may perform the step shown in S606.

In a possible implementation, when the energy is greater than the first energy threshold and the variance is less than the variance threshold, the terminal device may also perform the step shown in S605.

It can be understood that when the variance corresponding to one sound source angle is greater than the variance threshold within the time period, and the energy of the sound source is less than the first energy threshold, it can be determined that the sound source can be scatter noise, and the scatter noise does not affect determining accuracy. Therefore, it can be determined that the channel of sound source is accurately separated. When the variance corresponding to one sound source angle within the time period is less than or equal to the variance threshold, and the energy of the sound source is greater than the first energy threshold, it can be determined that the sound source is inaccurately separated.

In a possible implementation, the terminal device can also determine whether the sound source is accurately separated by using only the energy of the sound source.

S605: The terminal device determines that the current sound source is inaccurately separated.

S606: The terminal device determines that the current sound source is accurately separated.

S607: The terminal device counts an accuracy situation of all sound sources and determines accuracy of the sound source in the current scenario.

When it is determined that the N channels of audio signals in the scenario are accurately separated, the terminal device determines that the sound source in the current scenario is accurately separated, and then performs the step shown in S405. When it is determined that part of signals in the N channels of audio signals are accurately separated and part of signals are inaccurately separated in the scenario, the terminal device determines that the sound source is partially accurately separated in the current scenario, and then performs the step shown in S406. Alternatively, when it is determined that the N channels of audio signals in the scenario are inaccurately separated, the terminal device determines that the sound source in the current scenario is inaccurately separated, and then performs the step shown in S406.

It can be understood that the terminal device can perform accuracy analysis on sound source separation based on the direction of the sound source in which the N channels of audio signals are located and the energy of the N channels of audio signals.

S405: When it is determined that the sound source in the current scenario is accurately separated, the terminal device outputs the N channels of audio signals.

In a possible implementation, in the interface shown in b in FIG. 3, when the terminal device determines that the sound source in the scenario is accurately separated, when generating the video corresponding to the picture in picture 302, the terminal device can suppress the sound source other than the sound source of the target 103 in the N channels of audio signals (or enhance the sound source of the target 103), so that the sound of the target 103 can be highlighted in the video corresponding to the picture in picture 302, and a stereoscopic sense of the sound in a picture-in-picture scenario can be improved.

Among them, the method in which the terminal device suppresses the sound source other than the sound source of the target 103 in the scenario (or to enhance the sound source of the target 103) may include: The terminal device enhances the sound source of the target 103, such as multiplying the sound source of the target 103 by a first gain coefficient, for example, the first gain coefficient may be a value of 1.5. The sound source other than the sound source of the target 103 is enhanced, such as multiplying by a second gain coefficient, for example, the second gain coefficient can be a value of 1.2, where the second gain coefficient is less than the first gain coefficient. Alternatively, when the terminal device keeps the sound source corresponding to 103 unchanged, the sound source other than the sound source of the target 103 is suppressed, such as multiplying by a third gain coefficient, for example, the third gain coefficient may be a value of 0.7.

It can be understood that the suppression described in this embodiment of this application is a concept of relative suppression, the enhancement is a concept of relative enhancement, and the method for suppressing the sound source in this embodiment of this application is not specifically limited.

S406: When it is determined that the sound source is partially accurately separated or the sound source is inaccurately separated in the current scenario, the terminal device outputs an audio signal before the sound source separation.

The audio signal before the sound source separation may be the initial audio signal in frequency domain described in the step shown in S402.

In a possible implementation, in the interface shown in b in FIG. 3, when the terminal device determines that the sound source is inaccurately separated in the scenario, the terminal device can use the audio signal before the sound source separation when generating the video corresponding to the picture in picture 302.

It can be understood that when it is determined that the sound source is partially accurately separated or the sound source is inaccurately separated in the current scenario, the audio signal output by the terminal device may not be limited to the audio signal before the sound source separation, and the output audio signal may alternatively be a signal output through other algorithmic processing on the N channels of audio signals. This is not limited in this embodiment of this application.

Based on this, the terminal device can perform, based on the direction of the N channels of audio signals and the energy of the N channels of audio signals, accuracy analysis on N channels of audio signals obtained by separating the sound source, so that the terminal device can perform subsequent audio signal processing based on a result obtained through the accuracy analysis.

According to the embodiment corresponding to FIG. 4 above, in a possible implementation, after S401, when the terminal device receives the operation of the user selecting the target object in the recording interface, the terminal device may display the picture in picture including the target object, and enhance the sound source corresponding to the target object (or suppress a sound source other than the target object) when generating the video corresponding to the picture in picture.

Figure 7:
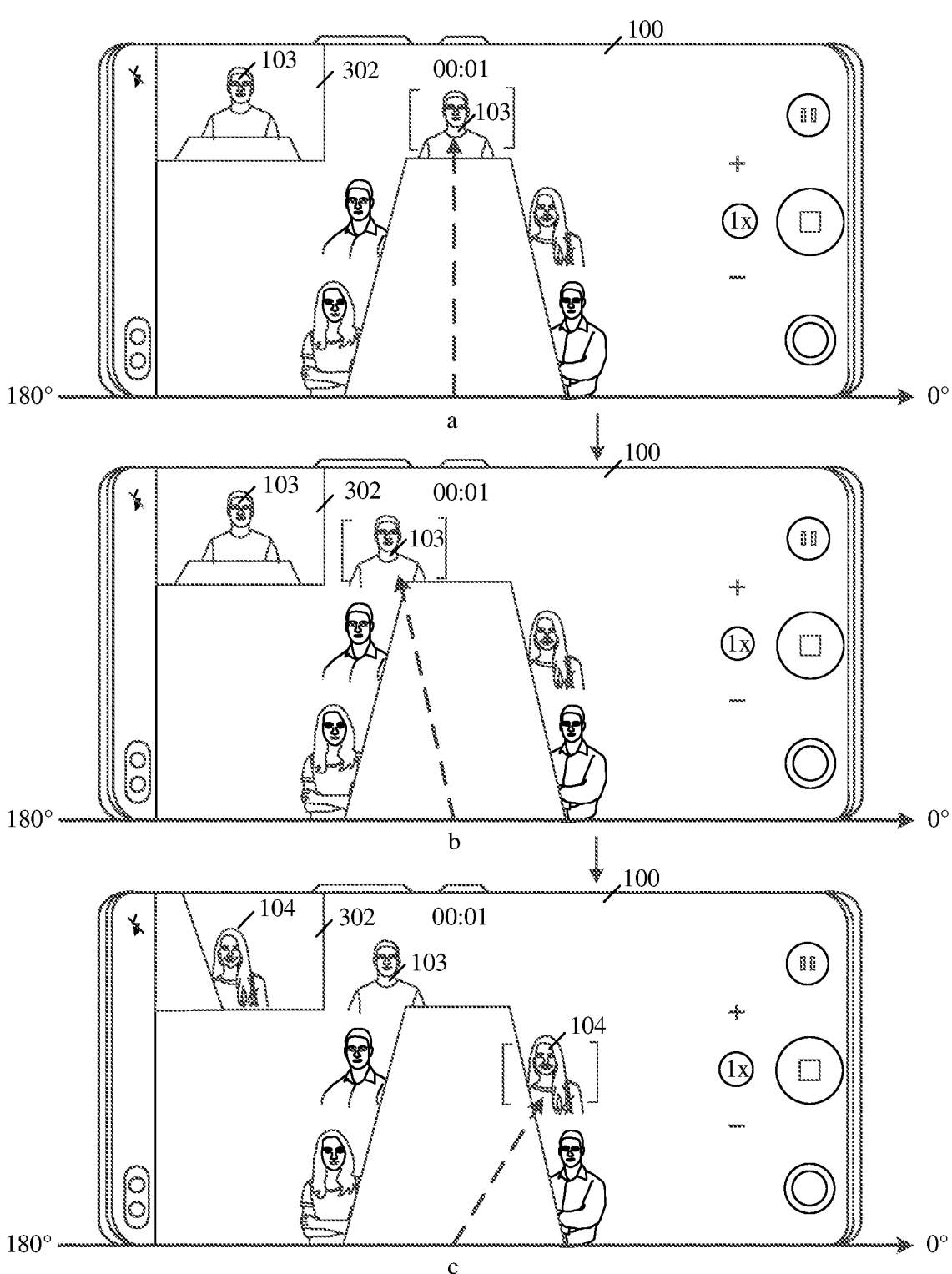
FIG. 7 is a schematic diagram of interfaces of selecting a target object according to an embodiment of this application.

For example, FIG. 7 is a schematic diagram of interfaces of selecting a target object according to an embodiment of this application. In the embodiment corresponding to FIG. 7, exemplary descriptions are made by using an example in which the target object is an object 103. In the embodiment corresponding to FIG. 7, a coordinate system is established centered on a terminal device, and the terminal device can identify an audio signal of surrounding 360°. Because the terminal device cannot distinguish between a forward direction of the terminal device and a backward direction of the terminal device, an example in which the forward direction of the terminal device is 0° to 180° is used to describe a sound source identified by the terminal device.

When the terminal device receives a triggering operation on the target 103, the terminal device may display an interface including a picture in picture 302 as shown in a in FIG. 7, and determine an angle (or coordinates) of the target 103 based on image recognition (for example, face recognition). Further, when the terminal device receives an operation of a user ending recording, the terminal device can determine accuracy of the sound source in a current scenario based on the steps shown in S402 to S406, output a corresponding audio signal, and generate a video corresponding to a preview picture 100 and a video corresponding to the picture in picture 302.

In the video corresponding to the preview picture 100, the terminal device can output the corresponding audio signal after determining the accuracy of the sound source based on the steps shown in S402 and S406, and obtain the video corresponding to the preview picture 100 in combination with a multi-frame picture corresponding to the shot preview picture 100.

In the video corresponding to the picture in picture 302, after determining the accuracy of the sound source based on the steps shown in S402 and S406, the terminal device can determine the sound source of the target 103 in combination with the angle of the target 103 obtained through the image recognition and a sound source angle corresponding to the sound source in the step shown in S404. Further, the terminal device suppresses the sound source other than the sound source of the target 103 in the scenario, and combines the shot multi-frame image including the target 103 to obtain the video corresponding to the picture in picture 302.

In a possible implementation, when the terminal device receives the operation of the user selecting the target object, and when the terminal device combines the angle of the target 103 obtained through the image recognition, but does not detect the sound source angle corresponding to the sound source from the step shown in S404, the terminal device can determine that the target 103 may not emit a sound, so it is difficult to separate the sound source of the target 103 during a sound source separation process. At this time, the terminal device may determine a sound source around the target 103 as the sound source of the target 103, for example, a sound source at a minimum angle of the target 103 is used as the sound source of the target 103. Further, the terminal device can enhance the sound source around the target 103 in the scenario.

Based on this, the terminal device generates a video including the target object based on the operation of the user selecting the target object, and can suppress a sound source other than the target object in the video including the target object to enhance a stereoscopic sense of a sound of the target object.

In the embodiment corresponding to a in FIG. 7, based on selecting the target object, the terminal device can also support functions such as real-time tracking for the target object and automatic switching of the target object.

In one implementation, the terminal device can support real-time tracking for the target object. For example, after the user selects the target object, the terminal device can track a location of the target object in real time.

For example, in an interface shown in a in FIG. 7, when the target 103 is moved to the left, for example, from a location shown in a in FIG. 7 to a location shown in b in FIG. 7, the terminal device may track the target 103 in real time based on the image recognition to determine an angle (or coordinates) of the target 103 after the moving.

It can be understood that in a subsequent video corresponding to the picture in picture 302, the terminal device may continue to suppress the sound source of the real-time tracked target 103.

Further, when the terminal device can track the location of the target object in real time, and when the terminal device receives an operation of the user switching the target object, the terminal device can switch the tracked target object. For example, in the interface shown in b in FIG. 7, when the terminal device tracks the target 103, and when the terminal device receives the triggering operation of the user on the target 104, the terminal device may stop tracking the target 103 and start tracking the target 104, and display an interface shown in c in FIG. 7. In the interface shown in c in FIG. 7, the terminal device can display a picture corresponding to the target 104 in the picture in picture 302.

It can be understood that in a subsequent video corresponding to the picture in picture 302, the terminal device may enhance a sound source of the target 104 at a moment when the user switches the target object 104. For the method for determining the sound source angle of the target 104 and the method for enhancing the sound source of the target 104, refer to the corresponding descriptions of the target 103. Details are not described herein again.

In another implementation, the terminal device can support automatic switching of the target object. For example, after the user selects the target object, the terminal device can track a location of a sound source with the highest energy based on energy of the sound source in the scenario.

For example, in the interface shown in b in FIG. 7, when the user selects the target 103, and when the terminal device detects that energy of the target 104 in the preview picture 100 is the highest, the terminal device can display the interface shown in c in FIG. 7. In the interface shown in c in FIG. 7, the terminal device can display a picture corresponding to the target 104 in the picture in picture 302.

It can be understood that in a subsequent video corresponding to the picture in picture 302, the terminal device can enhance the sound source of the target 104 when the terminal device detects the energy of the target 104 to be the highest.

In a possible implementation, when the terminal device tracks the sound source with the highest energy based on the energy of the sound source in the scenario, and when there are a plurality of sound sources with the same energy, the terminal device automatically tracks a target located in the middle of the scenario (for example, an angle is located near) 90°, the terminal device automatically tracks the target that is the closest to a target object with the highest user-selected quantity, or the terminal device automatically tracks a target that is the closest to a target object that is selected last time, etc.

In a possible implementation, when the terminal device tracks the sound source with the highest energy based on the energy of the sound source in the scenario, and when the terminal device receives the operation of the user switching the target object, the terminal device can stop automatically tracking the sound source with the highest energy and track the target object selected by the user.

Figure 8:
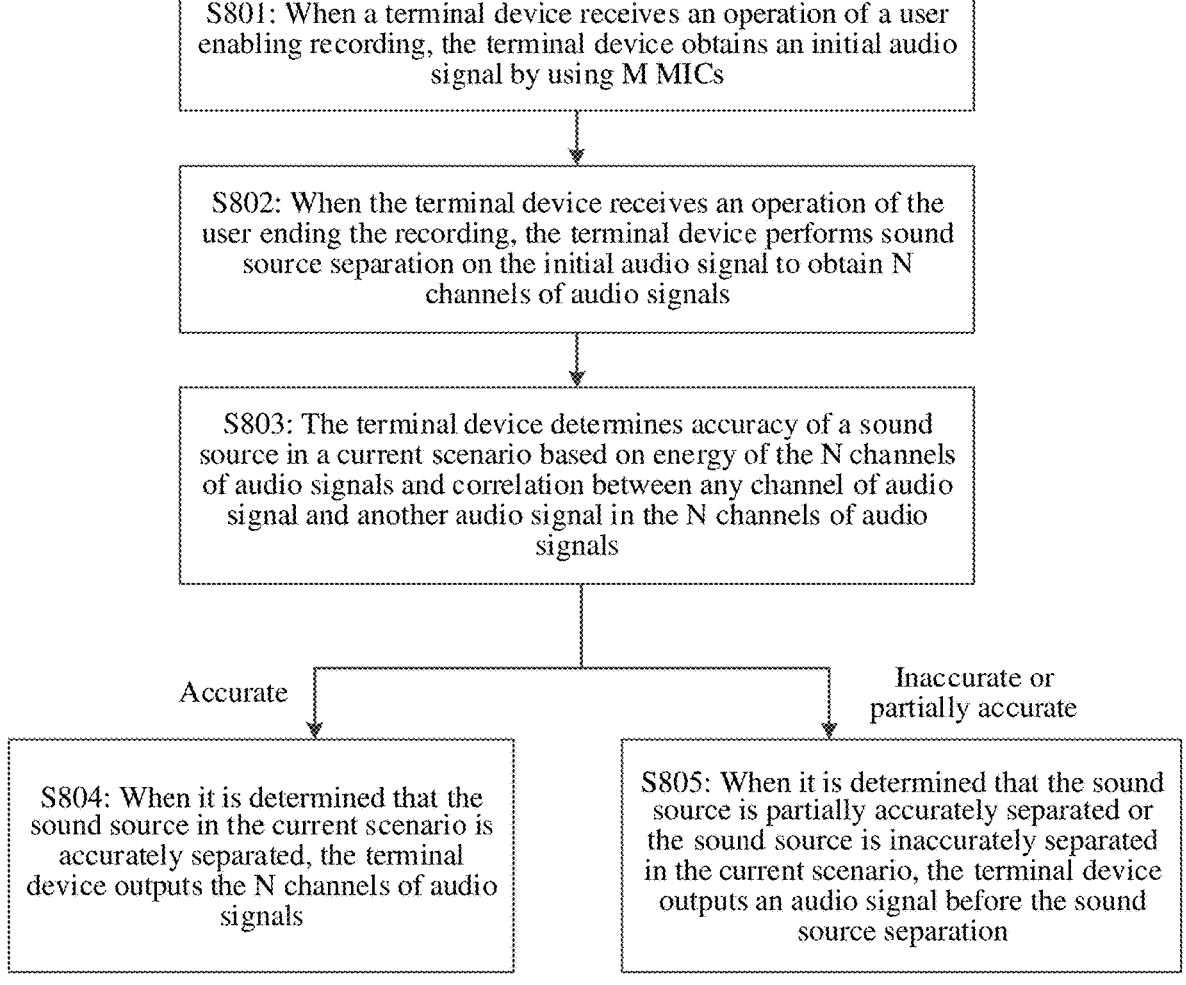
FIG. 8 is a schematic flowchart of an audio processing method according to an embodiment of this application.

Method 2: The Audio Processing Method Based on Determining Sound Source Correlation For example, FIG. 8 is a schematic flowchart of an audio processing method according to an embodiment of this application.

S801: When a terminal device receives an operation of a user enabling recording, the terminal device obtains an initial audio signal by using M MICs.

S802: The terminal device performs sound source separation on the initial audio signal to obtain N channels of audio signals.

For the steps shown in S801 and S802, refer to the steps shown in S401 and S402 in the embodiment corresponding to FIG. 4. Details are not described herein again.

S803: The terminal device determines accuracy of a sound source in a current scenario based on energy of the N channels of audio signals and correlation between any channel of audio signal and another audio signal in the N channels of audio signals.

The correlation indicates a similarity degree between two channels of signals. It can be understood that, because any two of the N channels of audio signals must be uncorrelated, accuracy of sound source separation can be determined by using the correlation.

Figure 9:
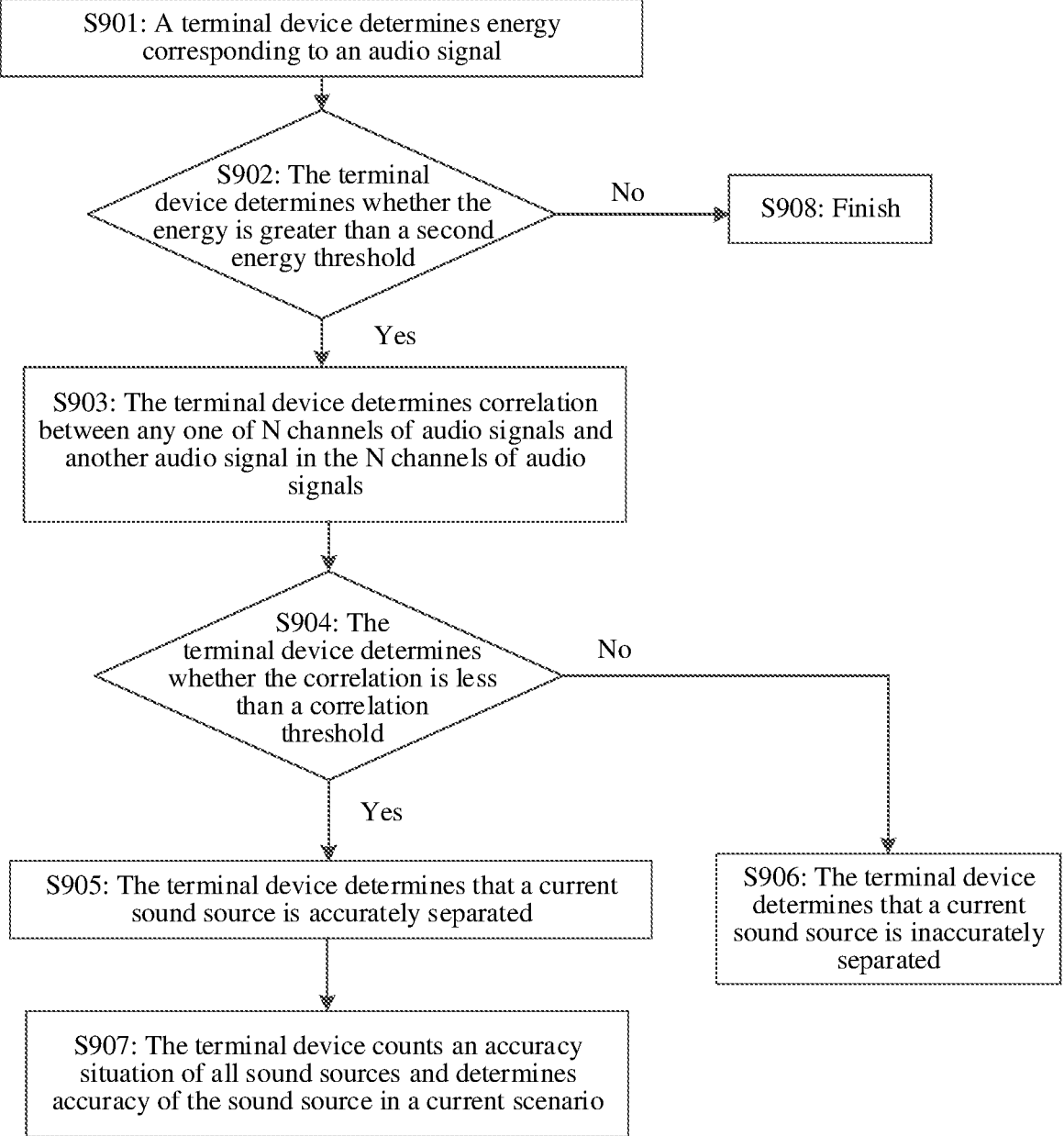
FIG. 9 is another schematic flowchart of accuracy analysis of a sound source according to an embodiment of this application.

For example, the terminal device can determine the accuracy of any one of the N channels of audio signals according to an embodiment corresponding to FIG. 9, and then output an accuracy situation of the sound source in the current scenario. For example, FIG. 9 is another schematic flowchart of accuracy analysis of a sound source according to an embodiment of this application.

S901: A terminal device determines energy corresponding to an audio signal.

The audio signal may be any one of N channels of audio signals.

S902: The terminal device determines whether the energy is greater than a second energy threshold.

The second energy threshold and a first energy threshold can be the same. When the terminal device determines that the energy is greater than the second energy threshold, the terminal device may perform the step shown in S903. Alternatively, when the terminal device determines that the energy is less than or equal to the second energy threshold, the current audio signal can be considered as scatter noise, and no subsequent correlation calculation of audio can be performed, for example, performing S908.

S903: The terminal device determines correlation between the any one of the N channels of audio signals and another audio signal in the N channels of audio signals.

Specifically, a correlation calculation formula can be:

$$\gamma_{(t,\omega)} = \frac{\phi_{(a,b)}(t,\omega)}{\sqrt{\phi_{(a,a)}(t,\omega)\phi_{(b,b)}(t,\omega)}} \qquad \text{Formula (13)}$$

$\gamma$ represents correlation, a represents the any one of the N channels of audio signals, and b represents the another audio signal in the N channels of audio signals. t represents a quantity of frames of Fourier transform, which is equivalent to time, and $\omega$ represents frequency.

$$\phi_{(a,b)}(t,\omega) = E\{x_{(a,b)}(t,\omega)x^*_{(a,b)}(t,\omega)\} \qquad \text{Formula (14)}$$

$$\phi_{(a,a)}(t,\omega) = E\{x_{(a,a)}(t,\omega)x^*_{(a,a)}(t,\omega)\}$$

$$\phi_{(b,b)}(t,\omega) = E\{x_{(b,b)}(t,\omega)x^*_{(b,b)}(t,\omega)\}$$

* represents a conjugate calculation and E represents a mathematical expectation.

It can be understood that, because N channels of audio signals obtained by separating the sound source are independent of each other, and the audio signals that are independent of each other are not correlated, accuracy of audio signal separation can be determined by calculating the correlation between the any channel of audio signal and the another audio signal in the N channels of audio signals.

S904: The terminal device determines whether the correlation between the any channel of audio signal and the another audio signal in the N channels of audio signals is less than a correlation threshold.

When the terminal device determines that the correlation between the any one channel of audio signal and the another audio signal in the N channels of audio signals is less than the correlation threshold, the terminal device may perform the step shown in S905. Alternatively, when the terminal device determines that the correlation between the any channel of audio signal and the another audio signal in the N channels of audio signals does not satisfy that the correlation is less than the correlation threshold, the terminal device may perform the step shown in S906.

That the correlation between the any channel of audio signal and the another audio signal in the N channels of audio signals does not satisfy that the correlation is less than the correlation threshold can be understood as: The correlation between the any channel of audio signal and the another audio signal in the N channels of audio signals is greater than or equal to the correlation threshold. Alternatively, there are cases where correlation between the any channel of audio signal and partial separation in the N channels of audio signals is less than the correlation threshold, and the correlation between the any channel of audio signal and the partial separation in the N channels of audio signals is greater than or equal to the correlation threshold.

In a possible implementation, the terminal device can also determine, by using only the correlation between the any channel of audio signal and the another audio signal in the N channels of audio signals, whether the sound source is accurately separated.

S905: The terminal device determines that the current sound source is accurately separated.

S906: The terminal device determines that the current sound source is inaccurately separated.

S907: The terminal device counts an accuracy situation of all sound sources and determines accuracy of the sound source in the current scenario.

When it is determined that the N channels of audio signals in the scenario are accurately separated, the terminal device determines that the sound source in the current scenario is accurately separated, and then performs the step shown in S804. When it is determined that part of signals in the N channels of audio signals are accurately separated and part of signals are inaccurately separated in the scenario, the terminal device determines that the sound source is partially accurately separated in the current scenario, and then performs the step shown in S805. Alternatively, when it is determined that the N channels of audio signals in the scenario are inaccurately separated, the terminal device determines that the sound source in the current scenario is inaccurately separated, and then performs the step shown in S805.

S908: The terminal device ends determining that the accuracy of the current sound source separation.

It can be understood that the terminal device can perform accuracy analysis on the audio signal in the current scenario based on energy of the N channels of audio signals and the correlation between the any channel of audio signal and the another audio signal in the N channels of audio signals.

S804: When it is determined that the sound source in the current scenario is accurately separated, the terminal device outputs the N channels of audio signals.

S805: When it is determined that the sound source is partially accurately separated or the sound source is inaccurately separated in the current scenario, the terminal device outputs an audio signal before the sound source separation.

For the steps shown in S804 and S805, refer to the steps shown in S405 and S406. Details are not described herein again.

Based on this, the terminal device can perform, based on the energy of the N channels of audio signals and the correlation between the any channel of audio signal and the another audio signal in the N channels of audio signals, accuracy analysis on the audio signal obtained by separating the sound source, so that the terminal device can perform subsequent audio signal processing based on a result obtained through the accuracy analysis.

According to the corresponding described embodiments in FIG. 4 to FIG. 8 above, in a possible implementation, the terminal device can also determine the accuracy of the sound source separation according to Method 1 and Method 2. For example, when the terminal device determines that the sound source in the current scenario satisfies accuracy determining in Method 1 and accuracy determining in Method 2, the terminal device can determine that the sound source in the current scenario is accurately separated and output the corresponding audio signal.

It may be understood that, the interface described in embodiments of this application is merely an example and does not constitute a limitation to embodiments of this application.

Figure 10:
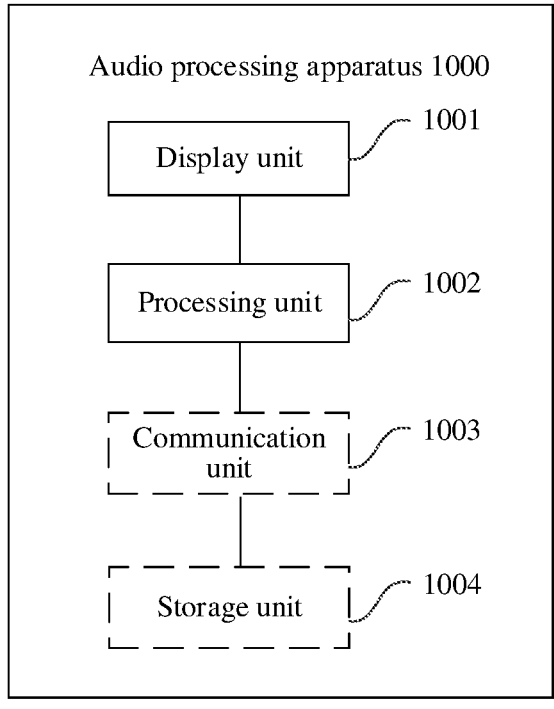
FIG. 10 is a schematic diagram of a structure of an audio processing apparatus according to an embodiment of this application.

The method provided in embodiments of this application is described above with reference to FIG. 3 to FIG. 9, and an apparatus for performing the above method provided in embodiments of this application is described below. FIG. 10 is a schematic diagram of a structure of an audio processing apparatus according to an embodiment of this application. The audio processing apparatus may be a terminal device in embodiments of this application, or may be a chip or a chip system in the terminal device.

As shown in FIG. 10, the audio processing apparatus 1000 may be used in a communication device, a circuit, a hardware component, or a chip, and the audio processing apparatus includes: a display unit 1001, and a processing unit 1002. The display unit 1001 is configured to support display steps performed by the audio processing apparatus 1000. The processing unit 1002 is configured to support information processing steps performed by the audio processing apparatus 1000.

Embodiments of this application further provide an audio processing apparatus 1000, including: a display unit 1001, and a processing unit 1002. The display unit 1001 is configured to display a first interface. The first interface includes: a control for enabling recording. When the terminal device receives an operation on the control for enabling recording, the display unit 1001 is further configured to enable the terminal device to display a second interface and obtain a first audio signal. The second interface includes a first picture and a second picture, the second picture is overlaid on the first picture, and the first picture includes content in the second picture. The second picture includes a target object. The processing unit 1002 is configured to perform sound source separation on the first audio signal to obtain N channels of audio signals. N is an integer greater than or equal to 2. The processing unit 1002 is further configured to generate a first video and a second video. The first video is obtained based on the first audio signal and the first picture. When the N channels of audio signals satisfy a preset condition, the second video is obtained based on the N channels of audio signals and the second picture. A second audio signal corresponding to the second video is obtained by processing a target audio signal in the N channels of audio signals and/or a signal other than the target audio signal in the N channels of audio signals. The target audio signal is an audio signal of the target object.

In a possible implementation, when the N channels of audio signals do not satisfy the preset condition, the second video is obtained based on the first audio signal and the second picture.

In a possible implementation, that the N channels of audio signals do not satisfy the preset condition includes: Energy of any one of the N channels of audio signals is greater than an energy threshold, and angle variance corresponding to an angle of the any audio signal within a time threshold is greater than a variance threshold; and/or the energy of the any audio signal is greater than the energy threshold and correlation of the any audio signal with another audio signal in the N channels of audio signals is greater than or equal to a correlation threshold.

In a possible implementation, the angle of the any audio signal is obtained based on column data corresponding to the any audio signal in a demixing matrix and a transfer function of the terminal device at each preset angle. The demixing matrix is obtained by the terminal device performing sound source separation on the first audio signal.

In a possible implementation, when a quantity of microphones in the terminal device is 2, a range of the preset angle is: 0°-180° or 180°-360°.

In a possible implementation, that the N channels of audio signals satisfy a preset condition includes: The energy of the any audio signal is greater than the energy threshold, and angle variance corresponding to the angle of the any audio signal within the time threshold is less than or equal to the variance threshold; and/or the energy of the any audio signal is greater than the energy threshold and the correlation of the any audio signal with the another audio signal is less than the correlation threshold.

In a possible implementation, when the terminal device receives an operation on the control for enabling recording, the display unit 1001 in the terminal device is specifically configured to display a third interface. The third interface includes the first picture, and the first picture includes the target object. When the terminal device receives an operation on the target object, the display unit 1001 is further specifically configured to display the second interface.

In a possible implementation, the second interface includes: a control for ending recording. When the terminal device receives an operation on the control for ending recording, the processing unit 1002 is specifically configured to perform sound source separation on the first audio signal to obtain the N channels of audio signals.

In a possible implementation, the audio processing apparatus 1000 may further include a communication unit 1003. Specifically, the communication unit is configured to support the audio processing apparatus 1000 to perform steps of transmitting data and receiving data. For example, the communication unit 1003 may be an input or output interface, a pin, a circuit, or the like.

In a possible embodiment, the audio processing apparatus may further include: a storage unit 1004. The processing unit 1002 is connected to the storage unit 1004 through a bus. The storage unit 1004 may include one or more memories, and the memory may be one or more devices or components in a circuit that are configured to store a program or data. The storage unit 1004 may exist independently, and is connected to the processing unit 1002 included by the audio processing apparatus by using a communication line. The storage unit 1004 may alternatively be integrated with the processing unit 1002.

The storage unit 1004 may store computer executable instructions of the method of the terminal device, so that the processing unit 1002 performs the method in the foregoing embodiments. The storage unit 1004 may be a register, a cache, a RAM, or the like, and the storage unit 1004 may be integrated with the processing unit 1002. The storage unit 1004 may be a read-only memory (read-only memory, ROM) or another type of static storage device that may store static information and instructions, and the storage unit 1004 may be independent of the processing unit 1002.

Figure 11:
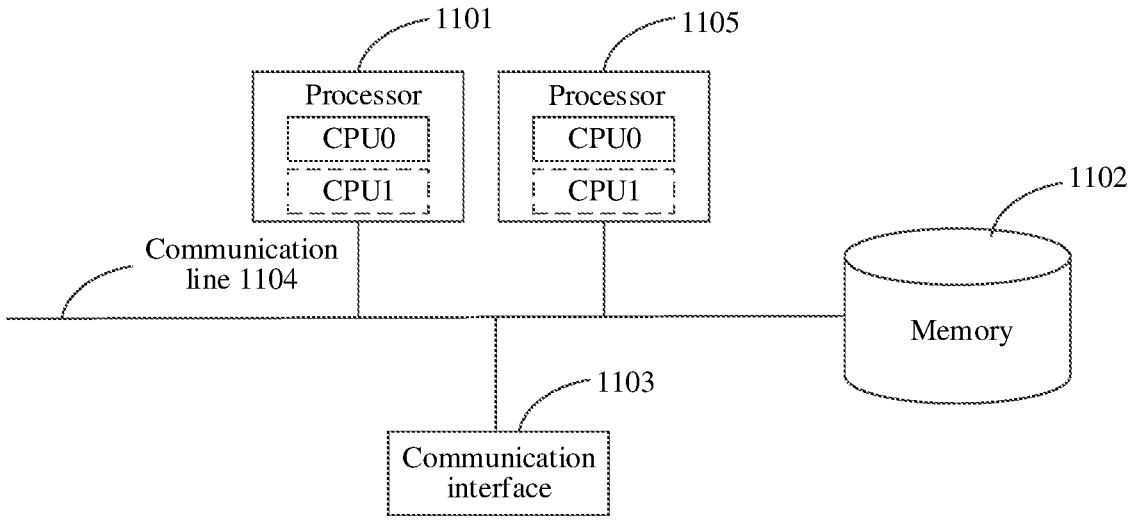
FIG. 11 is another schematic diagram of a hardware structure of a terminal device according to an embodiment of this application.

FIG. 11 is another schematic diagram of a hardware structure of a terminal device according to an embodiment of this application. As shown in FIG. 11, the terminal device includes a processor 1101, a communication line 1104, and at least one communication interface (where a communication interface 1103 is used as an example for description in FIG. 11).

The processor 1101 may be a general-purpose central processing unit (central processing unit, CPU), a microprocessor, an application-specific integrated circuit (application-specific integrated circuit, ASIC), or one or more integrated circuits configured to control execution of a program in the solutions of this application.

The communication line 1104 may include a circuit configured to transmit information between the foregoing components.

The communication interface 1103 uses any apparatus of a transceiver type to communicate with another device or a communication network such as an Ethernet, wireless local area networks (wireless local area networks, WLAN), and the like.

Possibly, the terminal device may further include a memory 1102.

The memory 1102 may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM) or a compact disc read-only memory (compact disc read-only memory, CD-ROM) or another compact disc storage, optical disc storage (including compressed optical discs, laser discs, optical discs, digital versatile optical discs, and Blu-ray discs), magnetic disk storage media, or another magnetic storage device, or any another medium that can be used to carry or store desired program code in the form of an instruction or a data structure and that can be accessed by a computer, but not limited thereto. The memory may exist independently, and is connected to the processor by the communication line 1104. The memory may be alternatively integrated with the processor.

The memory 1102 is configured to store computer executable instructions for performing the solutions of this application, and is controlled and executed by the processor 1101. The processor 1101 is configured to execute the computer executable instructions stored in the memory 1102 to implement the audio processing method provided in the following embodiments of this application.

Possibly, the computer executable instructions in this embodiment of this application may also be referred to as application code. This is not specifically limited in this embodiment of this application.

During specific implementation, in an embodiment, the processor 1101 may include one or more CPUs, for example, a CPU0 and a CPU1 in FIG. 11.

During specific implementation, in an embodiment, the terminal device may include a plurality of processors, for example, a processor 1101 and a processor 1105 in FIG. 11. Each of these processors may be a single-core (single-CPU) processor, or may be a multi-core (multi-CPU) processor. The processor herein may be one or more devices or circuits, and/or a processing core configured to process data (for example, computer program instructions).

The computer program product includes one or more computer instructions. When the computer program instructions are loaded and executed on the computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, including one or more usable media. For example, the usable medium may include a magnetic medium (for example, a floppy disk, a hard disk, or a magnetic tape), an optical medium (for example, a digital versatile disc (digital versatile disc, DVD)), a semi-conductive medium (for example, a solid-state disk (solid-state disk, SSD)), or the like.

An embodiment of this application further provides a computer-readable storage medium. All or some of methods in the foregoing embodiments may be implemented by using software, hardware, firmware, or any combination thereof. The computer-readable medium may include a computer storage medium and a communication medium, and may further include any medium that can transmit a computer program from one place to another. The storage medium may be any target medium accessible to a computer.

In a possible design, the computer-readable storage medium may include a compact disc read-only memory (compact disc read-only memory, CD-ROM), a RAM, a ROM, an EEPROM, or another optical disc memory. The computer-readable medium may include a magnetic disk memory or another magnetic disk storage device. Any connection line may also be appropriately referred to as a computer-readable medium. For example, if software is transmitted from a website, a server or another remote source by using a coaxial cable, an optical fiber cable, a twisted pair, a DSL or wireless technologies (such as infrared ray, radio, and microwave), the coaxial cable, optical fiber cable, twisted pair, DSL or wireless technologies such as infrared ray, radio, and microwave are included in the definition of the medium. A magnetic disk and an optical disc used herein include an optical disc (CD), a laser disc, an optical disc, a digital versatile disc (digital versatile disc, DVD), a floppy disk, and a blue ray disc, where the magnetic disk generally reproduces data in a magnetic manner, and the optical disc reproduces data optically by using laser.

The foregoing combination should also be included in the scope of the computer-readable medium. The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention Therefore, the protection scope of the present invention shall be subject to the protection scope of the claims.

What is claimed is:

1. An audio processing method, comprising:

displaying, by a terminal device, a first interface, wherein the first interface comprises: a control for enabling recording;

when the terminal device receives an operation on the control for enabling recording, displaying, by the terminal device, a second interface and obtaining a first audio signal, wherein the second interface comprises a first picture and a second picture, the second picture is overlaid on the first picture, and the first picture comprises content in the second picture, and the second picture comprises a target object;

performing, by the terminal device, sound source separation on the first audio signal to obtain N channels of audio signals, wherein N is an integer greater than or equal to 2; and generating, by the terminal device, a first video and a second video, wherein the first video is obtained based on the first audio signal and the first picture, when the N channels of audio signals satisfy a preset condition, the second video is obtained based on the N channels of audio signals and the second picture, a second audio signal corresponding to the second video is obtained by processing a target audio signal in the N channels of audio signals and/or a signal other than the target audio signal in the N channels of audio signals, and the target audio signal is an audio signal of the target object, wherein when the N channels of audio signals do not satisfy the preset condition, the second video is obtained based on the first audio signal and the second picture, and wherein that the N channels of audio signals do not satisfy the preset condition comprises:

that energy of any one of the N channels of audio signals is greater than an energy threshold, and angle variance corresponding to an angle of the any audio signal within a time threshold is greater than a variance threshold; and/or that the energy of the any audio signal is greater than the energy threshold and correlation of the any audio signal with another audio signal in the N channels of audio signals is greater than or equal to a correlation threshold.

2. The method according to claim 1, wherein the angle of the any audio signal is obtained based on column data corresponding to the any audio signal in a demixing matrix and a transfer function of the terminal device at each preset angle, wherein the demixing matrix is obtained by the terminal device performing sound source separation on the first audio signal.

3. The method according to claim 2, wherein when a quantity of microphones in the terminal device is 2, a range of the preset angle is: 0°-180° or 180°-360°.

4. The method according to claim 3, wherein the when the terminal device receives an operation on the control for enabling recording, displaying, by the terminal device, a second interface and obtaining a first audio signal comprises:

when the terminal device receives the operation on the control for enabling recording, displaying, by the terminal device, a third interface, wherein the third interface comprises the first picture, and the first picture comprises the target object; and when the terminal device receives an operation on the target object, displaying, by the terminal device, the second interface.

5. The method according to claim 4, wherein the second interface comprises: a control for ending recording, wherein the performing, by the terminal device, sound source separation on the first audio signal to obtain N channels of audio signals comprises:

when the terminal device receives an operation on the control for ending recording, performing, by the terminal device, sound source separation on the first audio signal to obtain the N channels of audio signals.

6. The method according to claim 1, wherein that the N channels of audio signals satisfy a preset condition comprises: that the energy of the any audio signal is greater than the energy threshold, and the angle variance corresponding to the angle of the any audio signal within the time threshold is less than or equal to the variance threshold; and/or that the energy of the any audio signal is greater than the energy threshold and the correlation of the any audio signal with the another audio signal is less than the correlation threshold.

7. A terminal device, comprising a memory, a processor, and a computer program stored in the memory and executable on the processor, wherein the processor, when executing the computer program, enables the terminal device to perform the following steps:

displaying, a first interface, wherein the first interface comprises: a control for enabling recording;

when the terminal device receives an operation on the control for enabling recording, displaying, a second interface and obtaining a first audio signal, wherein the second interface comprises a first picture and a second picture, the second picture is overlaid on the first picture, and the first picture comprises content in the second picture, and the second picture comprises a target object;

performing, sound source separation on the first audio signal to obtain N channels of audio signals, wherein N is an integer greater than or equal to 2; and generating, a first video and a second video, wherein the first video is obtained based on the first audio signal and the first picture, when the N channels of audio signals satisfy a preset condition, the second video is obtained based on the N channels of audio signals and the second picture, a second audio signal corresponding to the second video is obtained by processing a target audio signal in the N channels of audio signals and/or a signal other than the target audio signal in the N channels of audio signals, and the target audio signal is an audio signal of the target object, wherein when the N channels of audio signals do not satisfy the preset condition, the second video is obtained based on the first audio signal and the second picture, and wherein that the N channels of audio signals do not satisfy the preset condition comprises:

that energy of any one of the N channels of audio signals is greater than an energy threshold, and angle variance corresponding to an angle of the any audio signal within a time threshold is greater than a variance threshold; and/or that the energy of the any audio signal is greater than the energy threshold and correlation of the any audio signal with another audio signal in the N channels of audio signals is greater than or equal to a correlation threshold.

8. The terminal device according to claim 7, wherein the angle of the any audio signal is obtained based on column data corresponding to the any audio signal in a demixing matrix and a transfer function of the terminal device at each preset angle, wherein the demixing matrix is obtained by the terminal device performing sound source separation on the first audio signal.

9. The terminal device according to claim 8, wherein when a quantity of microphones in the terminal device is 2, a range of the preset angle is: 0°-180° or 180°-360°.

10. The terminal device according to claim 9, wherein the when the terminal device receives an operation on the control for enabling recording, displaying, a second interface and obtaining a first audio signal comprises:

when the terminal device receives the operation on the control for enabling recording, displaying, a third interface, wherein the third interface comprises the first picture, and the first picture comprises the target object; and when the terminal device receives an operation on the target object, displaying, the second interface.

11. The terminal device according to claim 10, wherein the second interface comprises: a control for ending recording, wherein the performing, by the terminal device, sound source separation on the first audio signal to obtain N channels of audio signals comprises:

when the terminal device receives an operation on the control for ending recording, performing, sound source separation on the first audio signal to obtain the N channels of audio signals.

12. The terminal device according to claim 7, wherein that the N channels of audio signals satisfy a preset condition comprises: that the energy of the any audio signal is greater than the energy threshold, and the angle variance corresponding to the angle of the any audio signal within the time threshold is less than or equal to the variance threshold; and/or that the energy of the any audio signal is greater than the energy threshold and the correlation of the any audio signal with the another audio signal is less than the correlation threshold.

13. A non-transitory computer-readable storage medium, comprising instructions, wherein when the instructions are run on a terminal device, the terminal device is enabled to perform the following steps:

displaying, a first interface, wherein the first interface comprises: a control for enabling recording;

when the terminal device receives an operation on the control for enabling recording, displaying, a second interface and obtaining a first audio signal, wherein the second interface comprises a first picture and a second picture, the second picture is overlaid on the first picture, and the first picture comprises content in the second picture, and the second picture comprises a target object;

performing, sound source separation on the first audio signal to obtain N channels of audio signals, wherein N is an integer greater than or equal to 2; and generating, a first video and a second video, wherein the first video is obtained based on the first audio signal and the first picture, when the N channels of audio signals satisfy a preset condition, the second video is obtained based on the N channels of audio signals and the second picture, a second audio signal corresponding to the second video is obtained by processing a target audio signal in the N channels of audio signals and/or a signal other than the target audio signal in the N channels of audio signals, and the target audio signal is an audio signal of the target object, wherein when the N channels of audio signals do not satisfy the preset condition, the second video is obtained based on the first audio signal and the second picture, and wherein that the N channels of audio signals do not satisfy the preset condition comprises:

that energy of any one of the N channels of audio signals is greater than an energy threshold, and angle variance corresponding to an angle of the any audio signal within a time threshold is greater than a variance threshold; and/or that the energy of the any audio signal is greater than the energy threshold and correlation of the any audio signal with another audio signal in the N channels of audio signals is greater than or equal to a correlation threshold.

14. The non-transitory computer-readable storage medium according to claim 13, wherein the angle of the any audio signal is obtained based on column data corresponding to the any audio signal in a demixing matrix and a transfer function of the terminal device at each preset angle, wherein the demixing matrix is obtained by the terminal device performing sound source separation on the first audio signal.

* * * * *